United States Patent
Sawada et al.

(10) Patent No.: US 7,120,459 B2
(45) Date of Patent: Oct. 10, 2006

(54) MOBILITY CONTROL APPARATUS, MOBILE COMMUNICATION TERMINAL AND MOBILE COMMUNICATION SYSTEM

(75) Inventors: Masahiro Sawada, Yokohama (JP); Masami Yabusaki, Kashiwa (JP); Takeshi Ihara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 284 days.

(21) Appl. No.: 10/352,863

(22) Filed: Jan. 29, 2003

(65) Prior Publication Data
US 2003/0143997 A1 Jul. 31, 2003

(30) Foreign Application Priority Data
Jan. 31, 2002 (JP) .............................. 2002-024790

(51) Int. Cl.
*H04M 1/00* (2006.01)
(52) U.S. Cl. ................... 455/550.1; 455/456.1; 455/404.2; 455/435.1; 455/432.1; 455/433
(58) Field of Classification Search ............... 455/433, 455/435.1, 422.1, 432.1, 432.3, 456.1, 456.2, 455/456.5, 456.6, 404.2, 550.1, 557
See application file for complete search history.

(56) References Cited

U.S. PATENT DOCUMENTS

| | | | |
|---|---|---|---|
| 5,572,221 A | | 11/1996 | Marlevi et al. |
| 5,832,381 A | | 11/1998 | Kauppi |
| 5,943,621 A | * | 8/1999 | Ho et al. ................ 455/456.3 |
| 5,950,132 A | * | 9/1999 | Armbruster et al. ..... 455/435.1 |
| 5,956,637 A | | 9/1999 | Ericsson et al. |
| 6,014,566 A | * | 1/2000 | Owada ....................... 455/444 |
| 6,018,573 A | * | 1/2000 | Tanaka ................... 379/211.02 |
| 6,167,266 A | | 12/2000 | Havinis et al. |
| 6,198,927 B1 | * | 3/2001 | Wright et al. ............ 455/435.1 |
| 6,311,065 B1 | * | 10/2001 | Ushiki et al. ............... 455/440 |
| 6,330,446 B1 | | 12/2001 | Mori |
| 6,385,454 B1 | * | 5/2002 | Bahl et al. ................. 455/450 |
| 6,640,115 B1 | * | 10/2003 | Fujimoto et al. .......... 455/567 |
| 2001/0014605 A1 | * | 8/2001 | Lindvall et al. ............ 455/427 |
| 2001/0034232 A1 | * | 10/2001 | Kuwahara .................. 455/435 |
| 2001/0044312 A1 | * | 11/2001 | Yamane ..................... 455/456 |
| 2004/0121769 A1 | * | 6/2004 | Aoki et al. .............. 455/435.1 |

FOREIGN PATENT DOCUMENTS

| | | | |
|---|---|---|---|
| JP | 04065996 A | * | 3/1992 |
| JP | 05-056472 | | 3/1993 |
| JP | 06-319168 | | 11/1994 |
| JP | 08-505027 | | 5/1996 |
| JP | 2001-218251 | | 8/2001 |

\* cited by examiner

*Primary Examiner*—George Eng
*Assistant Examiner*—Huy Phan
(74) *Attorney, Agent, or Firm*—Oblon, Spivak, McClelland, Maier & Neustadt, P.C.

(57) ABSTRACT

A mobility control apparatus comprises: a mobility control unit configured to perform a first processing in accordance with movement of a mobile communication terminal and generate a notification related to the first processing; a processing unit configured to perform a second processing different from the first processing performed by the mobility control unit, based on the notification; and a notification providing unit configured to obtain the notification from the mobility control unit and provide the notification to the processing unit. Moreover, the mobility control apparatus comprises: an instruction unit configured to generate a command to a mobility control unit performing processing in accordance with movement of a mobile communication terminal; a command providing unit configured to obtain the command from the instruction unit and provide the command to the mobility control unit; and the mobility control unit configured to perform the processing based on the command.

18 Claims, 20 Drawing Sheets

FIG. 3

| MOBILE CHARACTERISTIC No. | MOBILE CHARACTERISTICS | | | LOCATION AREA |
|---|---|---|---|---|
| | MOVEMENT SPEED | MOVEMENT RANGE | FREQUENCY OF INCOMING CALLS | |
| #1 | LOW SPEED (20 km/h or less) | SMALL | HIGH | SMALL |
| #2 | MEDIUM SPEED (20 to 40 km/h) | MEDIUM | MEDIUM | MEDIUM |
| #3 | HIGH SPEED (40 km/h or more) | LARGE | LOW | LARGE |

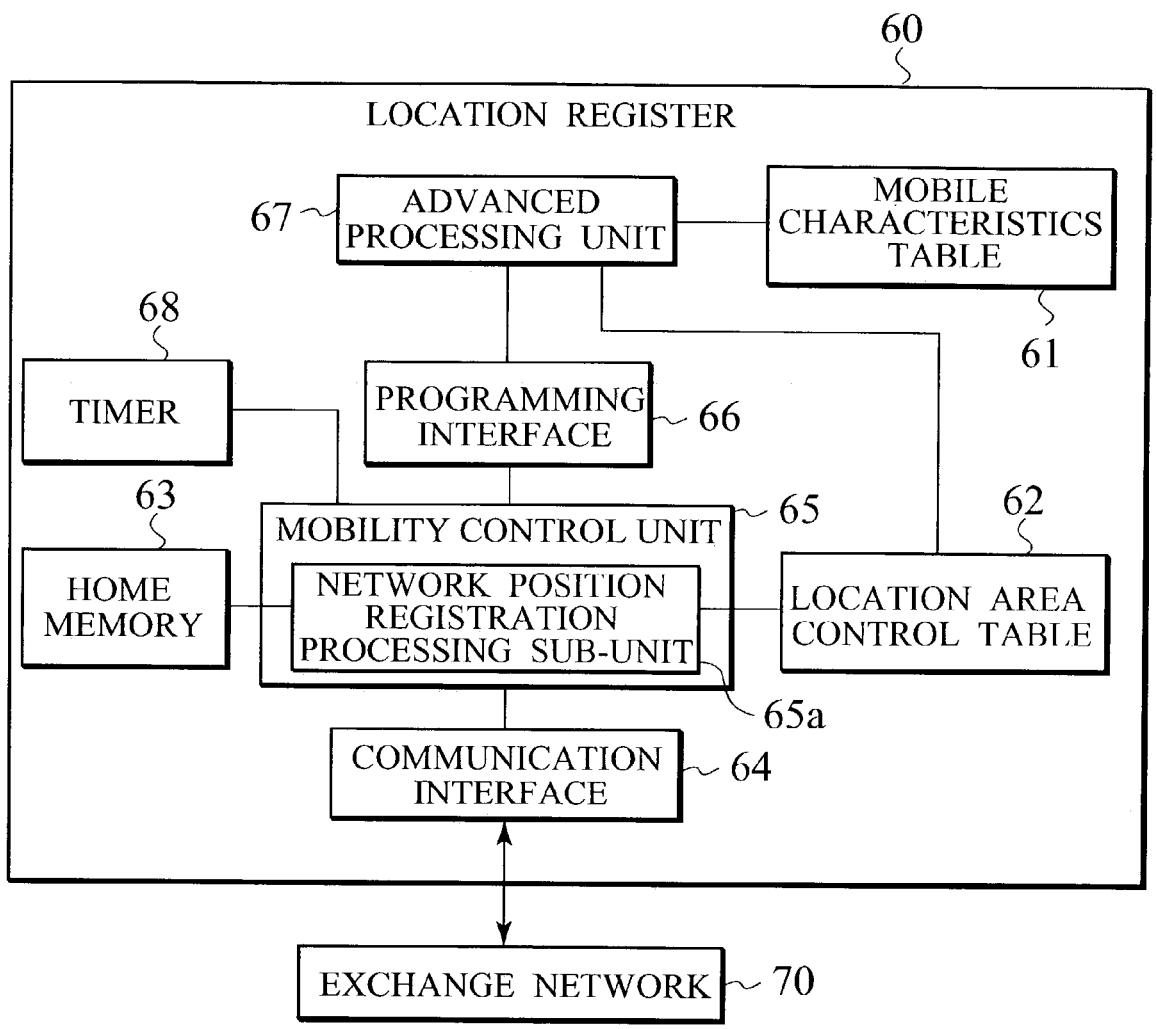

FIG. 7

| CELL ID / MOBILE CHARAC-TERISTIC No. | 1 | 2 | 3 | 4 | 5 | 6 | 7 | 8 | ... | N |
|---|---|---|---|---|---|---|---|---|---|---|
| #1 | #101 | #101 | #102 | #102 | #103 | #103 | #104 | #104 | ... | #1xx |
| #2 | #201 | #201 | #201 | #202 | #202 | #202 | #202 | #203 | ... | #2xx |
| #3 | #301 | #301 | #301 | #301 | #302 | #302 | #302 | #302 | ... | #3xx |

| MOBILE COMMUNICA-TION TERMINAL ID | CELL ID | LOCATION AREA ID | TIME | |
|---|---|---|---|---|
| ... | ... | ... | ... | ... |
| 10 | 4 | #102 | 10:10 | |
| 20 | 5 | #202 | 11:15 | |
| 30 | 1 | #301 | 12:00 | |
| ... | ... | ... | ... | ... |

63

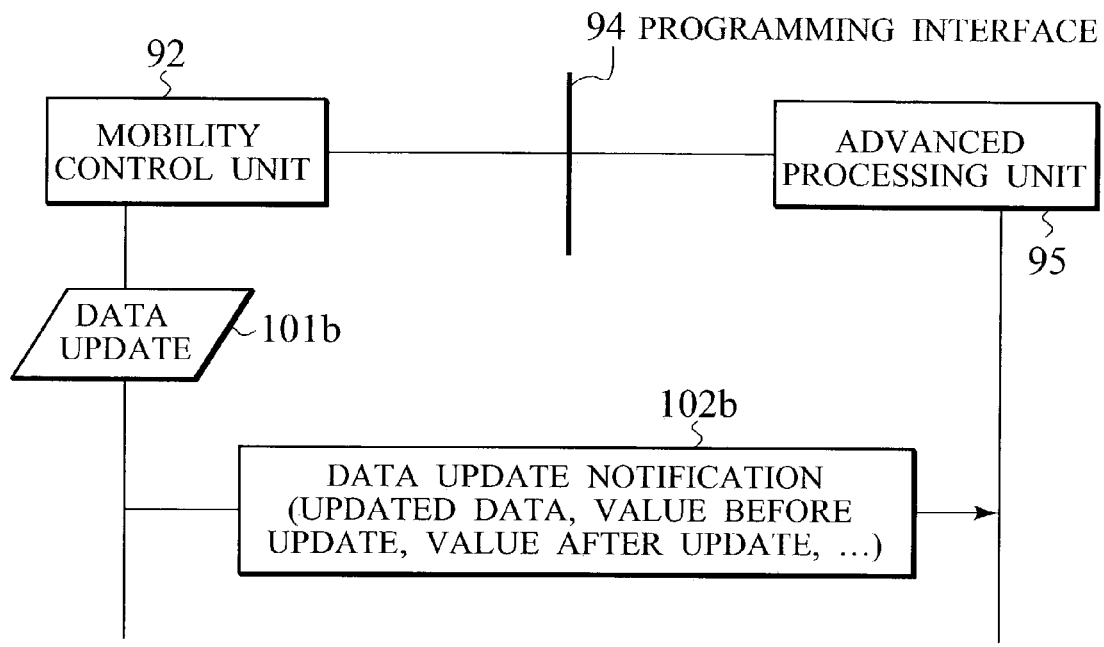
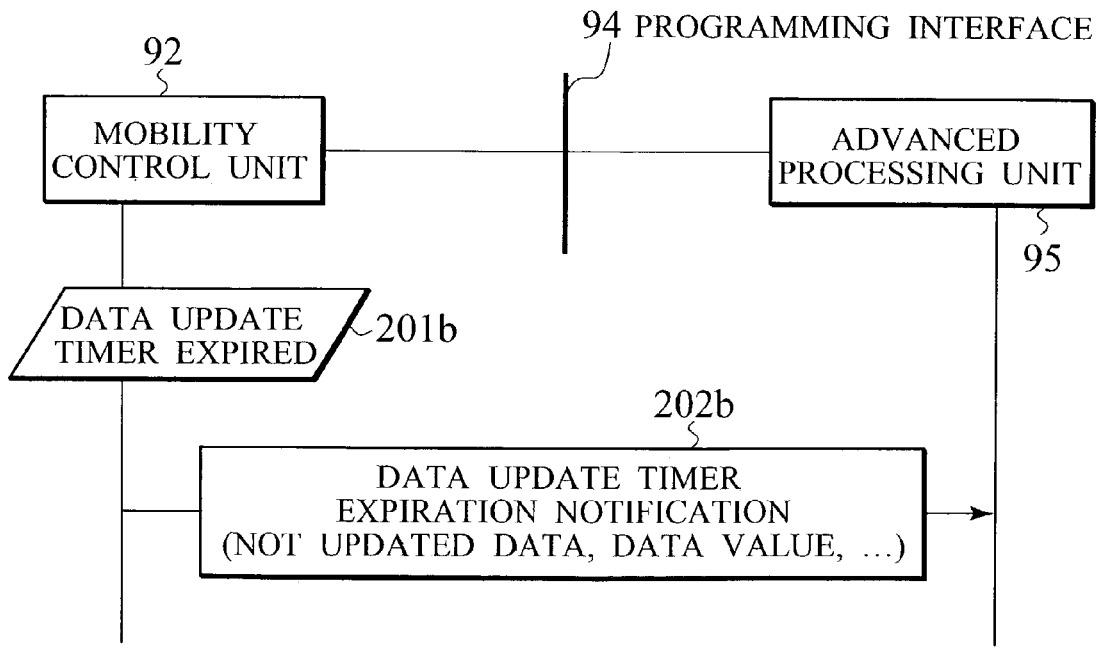

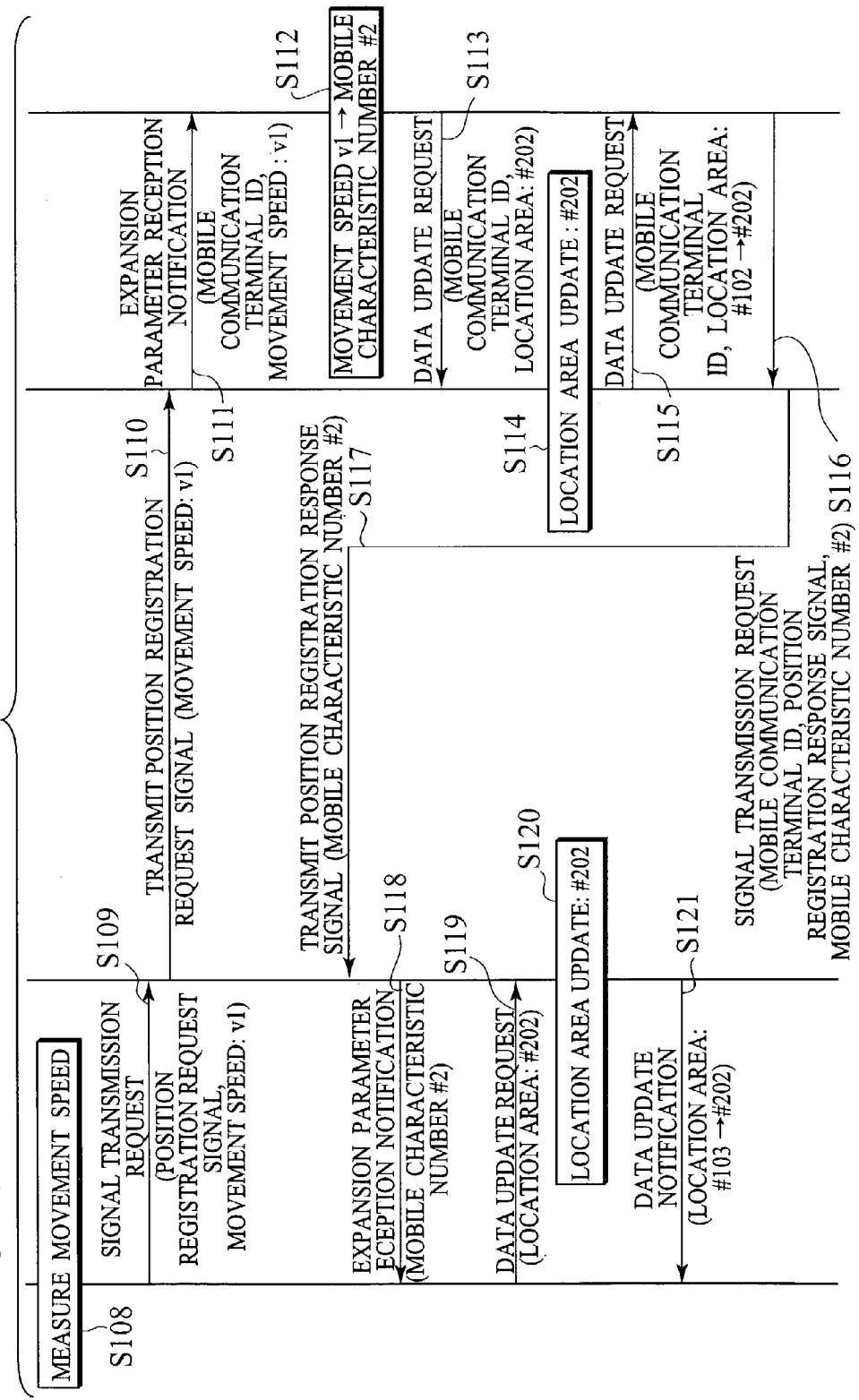

MOBILITY CONTROL APPARATUS, MOBILE COMMUNICATION TERMINAL AND MOBILE COMMUNICATION SYSTEM

CROSS REFERENCE TO RELATED APPLICATIONS

This application is based upon and claims the benefit of priority from the prior Japanese Patent Applications No. P2002-24790, filed on Jan. 31, 2002; the entire contents of which are incorporated herein by reference.

BACKGROUND OF THE INVENTION

1. Field of the Invention

The present invention relates to a mobility control apparatus, a mobile communication terminal and a mobile communication system.

2. Description of the Related Art

Conventionally, a mobile communication terminal includes a function of mobility control, which performs processing of a position registration request to a mobile communication network and the like, in accordance with the movement of the mobile communication terminal. Moreover, a mobility control apparatus installed in the mobile communication network accommodating the mobile communication terminal therein also includes a function of mobility control. Specifically, the mobility control performs processing such as position registration of the mobile communication terminal, handover and the like, in accordance with the movement of the mobile communication terminal. As shown in FIG. 1, a mobile communication terminal 290 includes a mobility control unit 290a responsible for the function of mobility control. A mobile communication network 230 also includes a mobility control unit 230a responsible for the function of mobility control in a mobility control apparatus and the like.

However, in the conventional mobile communication terminal 290 and the mobile communication network 230, in order to advance the mobility control function of the mobility control units 290a and 230a, such as improving the efficiency of the processing performed by the mobility control unit 290a and the mobility control unit 230a of the mobility control apparatus, the entire mobility control units 290a and 230a need to be re-developed and re-constructed. In other words, as shown in FIG. 1, advanced mobility control units 390a and 330a need to be developed, in which the mobility control function of the mobility control units 290a and 230a is advanced as a whole, and the entire mobility control units 290a and 230a need to be replaced by the entire advanced mobility control units 390a and 330a.

Therefore, advancement of the mobility control function of the mobile communication terminal or the mobility control apparatus installed in the mobile communication network brought about problems of enormous costs, work and time being required for development as well as replacement of the conventional mobility control unit and the advanced mobility control unit and costs thereof. These problems have prevented the mobility control function of the mobile communication terminal or the mobility control apparatus installed in the mobile communication network from being advanced, and an advanced mobility control method from being introduced into the mobile communication terminal or the mobility control apparatus.

BRIEF SUMMARY OF THE INVENTION

An object of the present invention is to facilitate the advancement of a mobility control function of a mobility control apparatus and a mobile communication terminal and to facilitate the introduction of an advanced mobility control method into the mobility control apparatus and the mobile communication terminal.

A mobility control apparatus according to an aspect of the present invention comprises: a mobility control unit configured to perform a first processing in accordance with the movement of a mobile communication terminal and generate a notification related to the first processing; a processing unit configured to perform a second processing, which is different from the first processing performed by the mobility control unit, based on the notification; and a notification providing unit configured to obtain the notification from the mobility control unit and provide the notification to the processing unit.

In such a mobility control apparatus, the mobility control unit performs the first processing in accordance with the movement of the mobile communication terminal and generates the notification related to the first processing. The notification providing unit obtains the notification from the mobility control unit and provides the notification to the processing unit. Then, based on the notification provided by the notification providing unit, the processing unit can perform the second processing different from the first processing. Accordingly, the mobility control unit and the processing unit are linked up with each other by the notification providing unit, and the processing unit can perform the second processing different from the first processing based on the first processing performed by the mobility control unit. Thus, the second processing performed by the processing unit can be easily added to the first processing performed by the mobility control unit. Therefore, the mobility control function of the mobility control apparatus can be easily advanced, by newly developing only the processing unit performing a second processing desired to be added to the first processing performed by the mobility control unit and by replacing only the processing unit with the newly developed processing unit. As a result, the advanced mobility control method can be easily incorporated into the mobility control apparatus.

Moreover, a mobility control apparatus according to an another aspect of the present invention comprises: an instruction unit configured to generate a command to a mobility control unit performing a processing in accordance with the movement of a mobile communication terminal; a command providing unit configured to obtain the command from the instruction unit and provide the command to the mobility control unit; and the mobility control unit configured to perform the processing based on the command.

In such a mobility control apparatus, the instruction unit generates the command to the mobility control unit. The command providing unit obtains the command from the instruction unit and provides the command to the mobility control unit. Then, the mobility control unit can perform the processing based on the command provided by the command providing unit. Accordingly, the mobility control unit and the instruction unit are linked up with each other by the command providing unit, and the mobility control unit can perform the processing based on the command generated by the instruction unit. Thus, the instruction unit can easily control the mobility control unit.

Therefore, the mobility control function of the mobility control apparatus can be easily advanced, by newly developing only the instruction unit generating a command for instructing processing desired to be performed by the mobility control unit and by replacing only the instruction unit with the newly developed instruction unit, As a result, the advanced mobility control method can be easily incorporated into the mobility control apparatus.

Moreover, a mobile communication terminal according to an aspect of the present invention comprises: a mobility control unit configured to perform a first processing in accordance with the movement of the mobile communication terminal and generate a notification related to the first processing; a processing unit configured to perform a second processing, which is different from the first processing performed by the mobility control unit, based on the notification; and a notification providing unit configured to obtain the notification from the mobility control unit and provide the notification to the processing unit.

In such a mobile communication terminal, the mobility control unit performs the first processing in accordance with the movement of the mobile communication terminal and generates the notification related to the first processing. The notification providing unit obtains the notification from the mobility control unit and provides the notification to the processing unit. Then, based on the notification provided by the notification providing unit, the processing unit can perform the second processing different from the first processing. Accordingly, the mobility control unit and the processing unit are linked up with each other by the notification providing unit, and the processing unit can perform the second processing different from the first processing based on the first processing performed by the mobility control unit. Thus, the second processing performed by the processing unit can be easily added to the first processing performed by the mobility control unit. Therefore, the mobility control function of the mobility control apparatus can be easily advanced, by newly developing only the processing unit performing a second processing desired to be added to the first processing performed by the mobility control unit and by replacing only the processing unit with the newly developed processing unit, As a result, the advanced mobility control method can be easily incorporated into the mobile communication terminal.

Moreover, a mobile communication terminal according to an another aspect of the present invention comprises: an instruction unit configured to generate a command to a mobility control unit performing a processing in accordance with the movement of the mobile communication terminal; a command providing unit configured to obtain the command from the instruction unit and provide the command to the mobility control unit; and the mobility control unit configured to perform the processing based on the command.

In such a mobile communication terminal, the instruction unit generates the command to the mobility control unit. The command providing unit obtains the command from the instruction unit and provides the command to the mobility control unit. Then, the mobility control unit can perform the processing based on the command provided by the command providing unit. Accordingly, the mobility control unit and the instruction unit are linked up with each other by the command providing unit, and the mobility control unit can perform the processing based on the command generated by the instruction unit. Thus, the instruction unit can easily control the mobility control unit.

Therefore, the mobility control function of the mobile communication terminal can be easily advanced, by newly developing only the instruction unit generating a command for instructing processing desired to be performed by the mobility control unit and by replacing only the instruction unit with the newly developed instruction unit. As a result, the advanced mobility control method can be easily incorporated into the mobile communication terminal.

BRIEF DESCRIPTION OF THE SEVERAL VIEWS OF THE DRAWINGS

FIG. 3 is a table showing mobile characteristics of a mobile communication terminal according to the embodiment of the present invention.

FIG. 5 is a block diagram showing a configuration of a location register according to the embodiment of the present invention.

FIG. 6 is a view showing a mobile characteristics table according to the embodiment of the present invention.

FIG. 7 is a view showing a location area control table according to the embodiment of the present invention.

FIG. 8 is a table showing a home memory according to the embodiment of the present invention.

FIG. 18 is a view showing an operation of data update performed by a mobility control unit of the mobile communication terminal according to the embodiment of the present invention.

FIG. 19 is a view showing an operation when the mobility control unit of the mobile communication terminal does not perform the data update for a predetermined period, according to the embodiment of the present invention.

FIGS. 29A and 29B are sequence diagrams showing a procedure of a communication method according to the embodiment of the present invention.

DETAILED DESCRIPTION OF THE INVENTION

With reference to the accompanying drawings, an embodiment of the present invention will be described below.

(Mobile Communication System)

Figure 1:
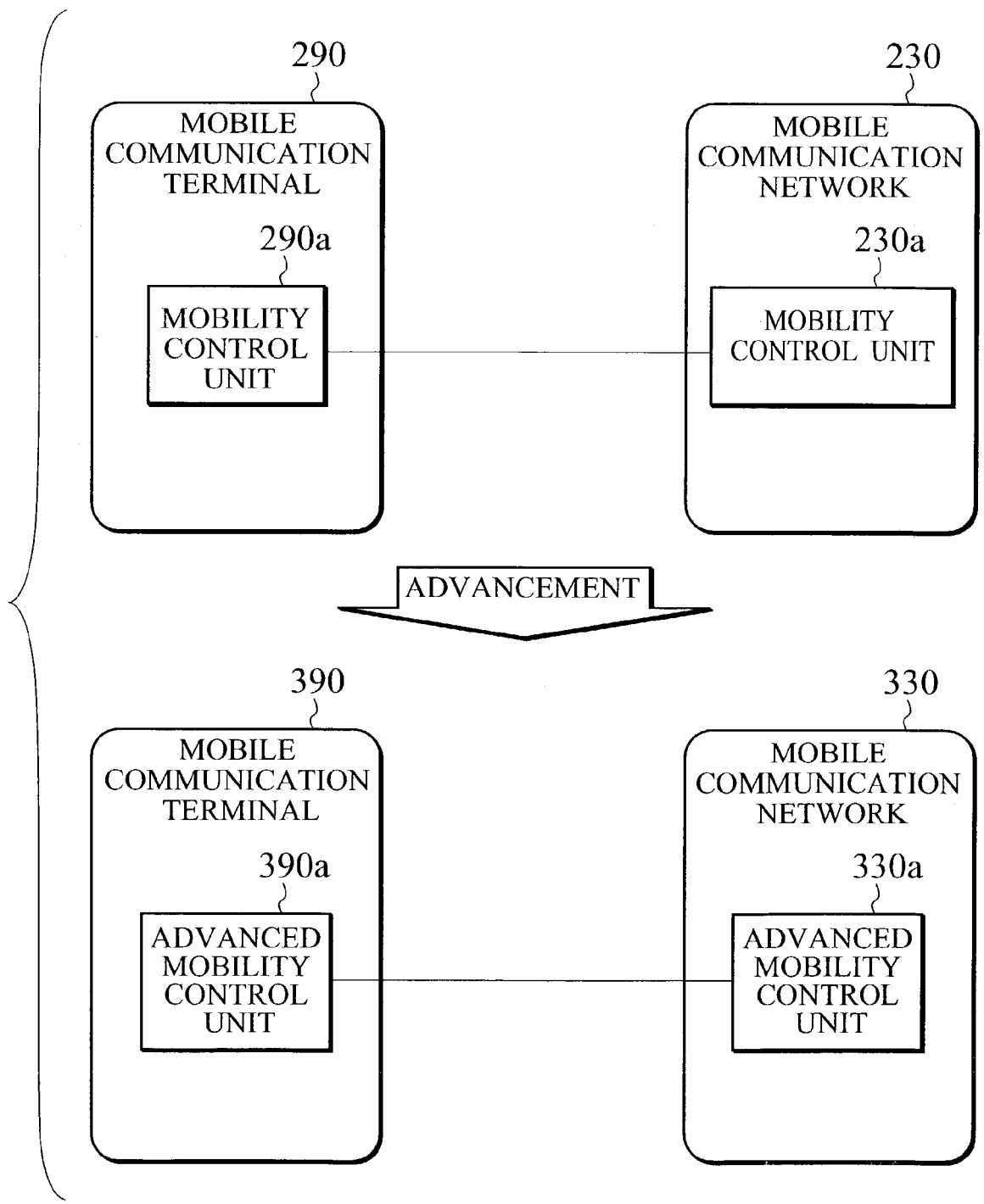
FIG. 1 is a view showing a conventional mobile communication terminal and a conventional mobile communication network.
Figure 2:
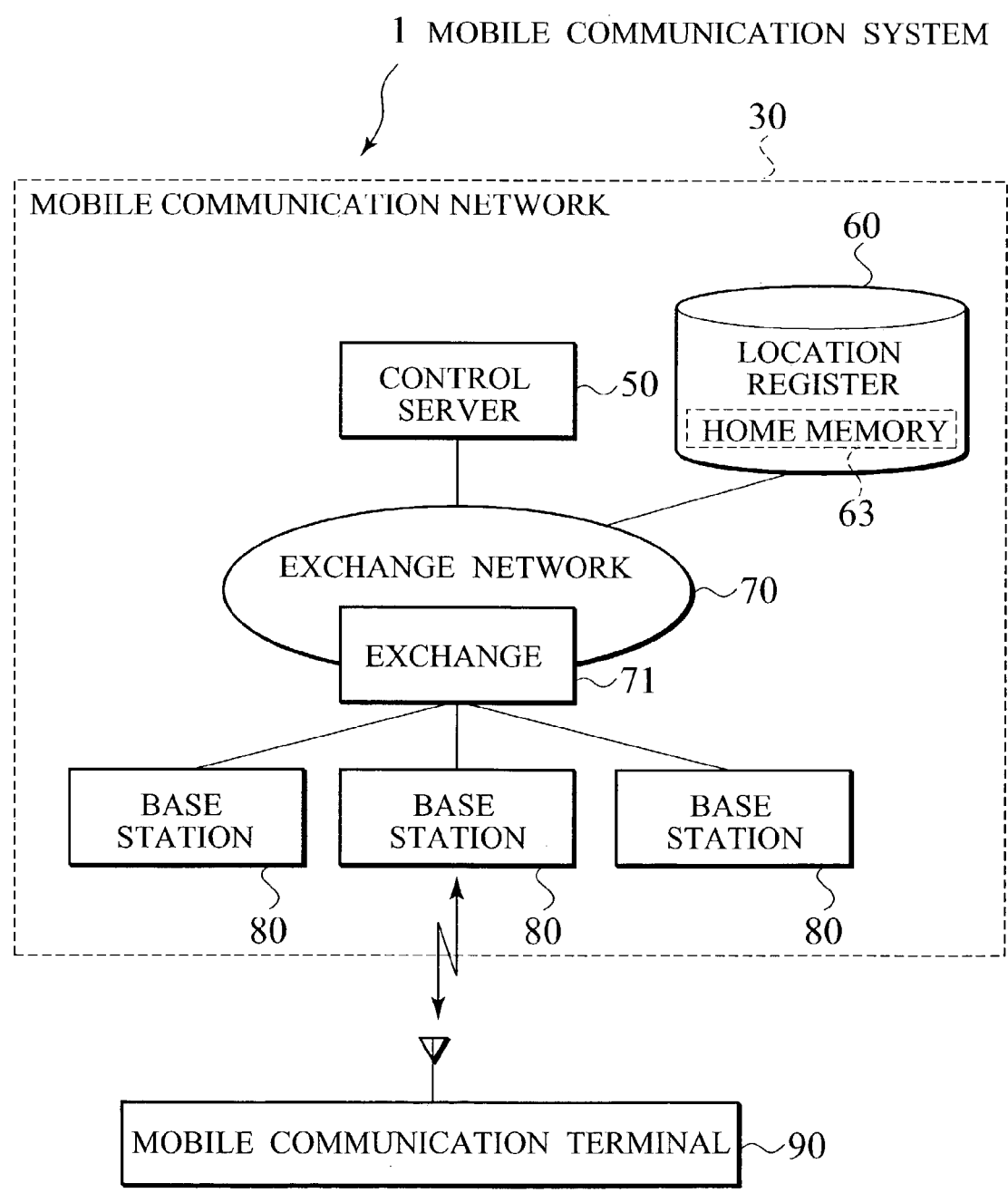
FIG. 2 is a block diagram showing a configuration of a mobile communication system according to an embodiment of the present invention.

As shown in FIG. 2, a mobile communication system 1 includes a mobile communication network 30 and a mobile communication terminal 90. The mobile communication system 1 provides the mobile communication terminal 90 with communication services such as a voice communication service, a data communication service, a motion picture communication service and the like.

The mobile communication network 30 provides communication services to the mobile communication terminal 90 that exists within the mobile communication network 30. The mobile communication network 30 includes a control server 50, a location register 60, an exchange network 70, an exchange 71 and a base station 80. The control server 50 is a server for controlling various information such as user contract information and the like. A user of the mobile communication terminal 90 who desires to use the communication service offered by the mobile communication system 1 signs a user contract related to a charge for the communication service with a telecommunications carrier running the mobile communication system 1. The control server 50 stores the user contract information. In the user contract information, included are: personal information that specifies a user, such as name, age, address and the like of the user; a telephone number; an IP address; and the like.

The location register 60 registers a position of the mobile communication terminal 90 of the user subscribing the communication service provided by the mobile communication network 30 in a home memory 63 and performs position registration of the mobile communication terminal 90. The exchange network 70 is a network in which a plurality of exchanges 71 are connected to each other. The respective exchanges 71 are connected to one or a plurality of base stations 80. The exchange 71 performs call connection processing and the like in accordance with a call-out request from the mobile communication terminal 90 or a call-in request thereto, the mobile communication terminal 90 existing within a wireless area covered by the exchange 71, that is, a wireless area covered by the respective base stations 80 connected to the exchange 71. The plurality of base stations 80 are disposed within a communication service area of the mobile communication network 30. Wireless areas covered by the respective base stations 80 are called cells. Each of the base stations 80 performs wireless communication with the mobile communication terminal 90 existing within the cell covered by the base station.

The mobile communication terminal 90 performs wireless communication with the base station 80 covering the wireless area where the mobile communication terminal exists. Characteristics that the mobile communication terminal 90 has are called mobile characteristics. Mobile characteristics differ from one another depending on behavior modes of the user of the mobile communication terminal 90 and use modes of the mobile communication terminal 90. Included among indexes indicating mobile characteristics are: movement speed of the mobile communication terminal 90; movement range thereof; frequency of incoming calls and the like. In this embodiment, mobile characteristics are divided into three types, each of which is denoted by a mobile characteristic number.

As shown in FIG. 3, the mobile communication terminal 90 of the mobile characteristic number #1 has a characteristic that the movement speed is lower than those of the mobile communication terminals 90 with the mobile characteristic numbers #2 and #3. For example, the mobile communication terminal 90 with the mobile characteristic number #1 has a characteristic that the movement speed is 20 km/h or less. As compared to the mobile communication terminals 90 with the mobile characteristic numbers #2 and #3, the mobile communication terminal 90 corresponding to the mobile characteristic number #1 tends to have a characteristic that the movement range is small and the frequency of incoming calls is high.

The mobile communication terminal 90 of the mobile characteristic number #2 has a characteristic that the movement speed is between those of the mobile communication terminals 90 of the mobile characteristic numbers #1 and #3, that is, its movement speed is a medium speed. For example, the mobile communication terminal 90 with the mobile characteristic number #2 has a characteristic that the movement speed is in the range of 20 to 40 km/h. The mobile communication terminal 90 corresponding to the mobile characteristic number #2 tends to have a characteristic that the movement range as well as the frequency of incoming calls are between those of the mobile communication terminals 90 with the mobile characteristic numbers #1 and #3, that is, the movement range and the frequency of incoming calls are at an intermediate level.

The mobile communication terminal 90 with the mobile characteristic number #3 has a characteristic that the movement speed is higher than those of the mobile communication terminals 90 with the mobile characteristic numbers #1 and #2. For example, the mobile communication terminal 90 of the mobile characteristic number #3 has a characteristic that the movement speed is 40 km/h or more. As compared to the mobile communication terminals 90 with the mobile characteristic numbers #1 and #2, the mobile communication terminal 90 corresponding to the mobile characteristic number #3 tends to have a characteristic that the movement range is large and the frequency of incoming calls is low.

Moreover, an area indicating a position of the mobile communication terminal 90 is called a location area. The location register 60 performs position registration of the mobile communication terminal 90 by registering in the home memory 63 which location area the mobile communication terminal 90 exists in. The location area can be set in accordance with the mobile characteristics. For example, as shown in FIG. 3, the mobile communication terminal 90 corresponding to the mobile characteristic number #1 tends to have a low movement speed and a smaller movement range. Thus, the location area thereof is set so as to be smaller than those of the mobile communication terminals 90 with the mobile characteristic numbers #2 and #3. The mobile communication terminal 90 corresponding to the mobile characteristic number #2 tends to have a medium movement speed and an intermediate level of the movement range. Thus, the location area thereof is set to be in an intermediate level between those of the mobile communication terminals 90 with the mobile characteristic numbers #1 and #3. The mobile communication terminal 90 corresponding to the mobile characteristic number #3 tends to have a high movement speed and a larger movement range. Thus, the location area thereof is set to be larger than those of the mobile communication terminals 90 with the mobile characteristic numbers #1 and #2.

Figure 4:
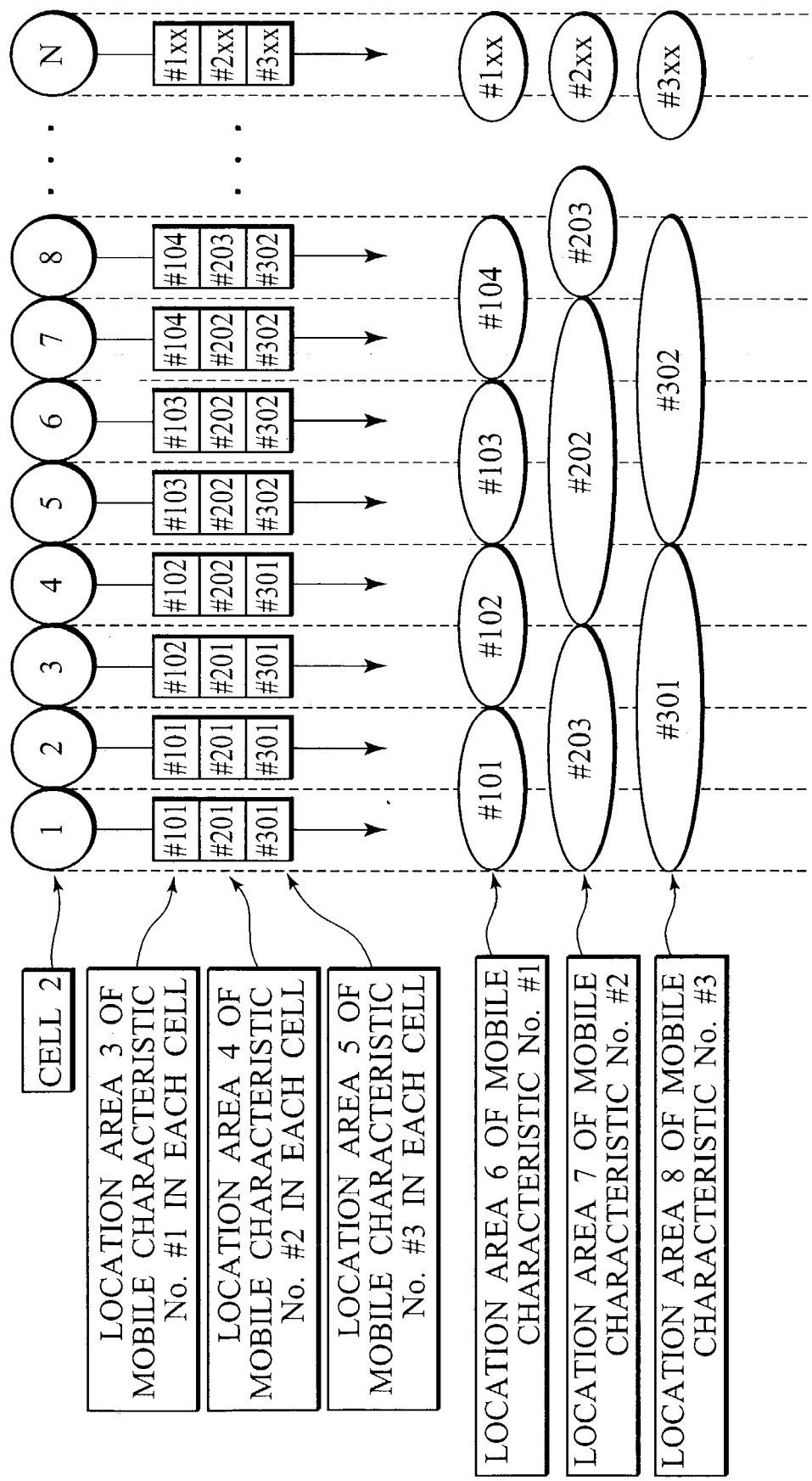
FIG. 4 is a view showing cells and location areas according to the embodiment of the present invention.

As shown in FIG. 4, within communication service areas where the communication system 1 offers communication services, a plurality of cells 2 exist, which are the wireless areas covered by the respective base stations 80. Cell IDs (identification) for identifying the cells are given to the respective cells. Location area IDs (identification) for identifying the location areas are given to the respective location areas. For example, as shown in FIG. 4, location area IDs having "1" in the hundred's place are given the location area of the mobile characteristic number #1, location area IDs having "2" in the hundred's place are given the location area of the mobile characteristic number #2, and location area IDs having "3" in the hundred's place are given the location area of the mobile characteristic number #3.

The location areas corresponding to the respective mobile characteristics are allocated to the respective cells 2. For example, allocated to the cell of the cell ID "1", are: the location area of the location area ID #101 as the location area 3 in the case that the mobile characteristic has a mobile characteristic number #1; the location area of the location area ID #201 as the location area 4 in the case that the mobile characteristic has a mobile characteristic number #2; and the location area of the location area ID #301 as the location area 5 in the case that the mobile characteristic has a mobile characteristic number #3. Similarly, the location areas of the respective mobile characteristics are allocated to the cells of the cell ID "2" to "N".

As a result, the location area 6 in which the mobile characteristic is the mobile characteristic number #1 is composed of two cells. For example, the location area of the location area ID #101 is composed of two cells having the cell IDs "1" and "2". Moreover, the location area 7 in which the mobile characteristic is the mobile characteristic number #2 is composed of three or four cells. For example, the location area of the location area ID #201 is composed of three cells having the cell IDs "1" to "3", and the location area of the location area ID #202 is composed of four cells having the cell IDs "4" to "7". Moreover, the location area 8 in which the mobile characteristic is the mobile characteristic number #3 is composed of four cells. For example, the location area of the location area ID #301 is composed of four cells having the cell IDs "1" to "4". The location area where the mobile communication terminal 90 exists is determined based on the cell and its mobile characteristics.

(Location Register)

Next, detailed description will be given for the location register 60. The location register 60 is a mobility control apparatus for performing mobility control of the mobile communication terminal 90. Herein, the mobility control means performing a processing in accordance with the movement of the mobile communication terminal 90. The mobility control performed by the location register 60, that is, the processing performed in accordance with the movement of the mobile communication terminal 90 includes: position registration of the mobile communication terminal 90; responses to inquiries from the base stations 80 and exchanges 81 regarding the position of the mobile communication terminal 90; and the like.

As shown in FIG. 5, the location register 60 comprises a mobile characteristics table 61, a location area control table 62, a home memory 63, a communication interface 64, a mobility control unit 65, a programming interface 66, an advanced processing unit 67 and a timer 68. The mobile characteristics table 61 is a mobile characteristics storage unit configured to store mobile characteristic numbers and mobile characteristics corresponding thereto.

As shown in FIG. 6, in the mobile characteristics table 61, are stored: a mobile characteristic that the movement speed is 20 km/h or less corresponding to the mobile characteristic number #1; a mobile characteristic that the movement speed is in the range of 20 to 40 km/h corresponding to the mobile characteristic number #2; and a mobile characteristic that the movement speed is 40 km/h or more corresponding to the mobile characteristic number #3.

The location area control table 62 is a location area storage unit configured to store relationships between cells and location areas corresponding to mobile characteristics. As shown in FIG. 7, in the location area control table 62, location area IDs of location areas are stored for each mobile characteristic number corresponding to cell IDs, the location areas being allocated to the cells. According to this location area control table 62, the location area ID of the location area where the mobile communication terminal 90 exists can be specified based on the cell ID and the mobile characteristic number.

The home memory 63 is a data storage unit configured to store data related to the mobile communication terminal 90. As shown in FIG. 8, in the home memory 63, data related to the position of the mobile communication terminal 90, such as the cell ID of the cell in which the mobile communication terminal 90 exists and the location area ID of the location area where the mobile communication terminal 90 exists, is stored as the data related to the mobile communication terminal 90 corresponding to a mobile communication terminal ID (identification) for identifying the mobile communication terminal. Moreover, in the home memory 63, as the data related to the mobile communication terminal 90, the time of registering data and time of updating the data that related to the position of the mobile communication terminal 90, such as the cell ID and location area ID and the like are stored. Moreover, data related to the mobile communication terminal 90 in addition to those described above can be stored in the home memory 63.

The communication interface 64 is a reception unit configured to receive a signal transmitted to the location register 60 in accordance with the movement of the mobile communication terminal 90 as well as a transmission unit configured to transmit a signal from the location register 60 in accordance with the movement of the mobile communication terminal 90. Included in the signal transmitted to the location register 60 in accordance with the movement of the mobile communication terminal 90 are: a signal for requesting position registration from the mobile communication terminal 90, that is, a signal for requesting registration of the location area ID of the location area where the mobile communication terminal 90 exists (hereinafter referred to as a "position registration request signal"); a signal for inquiring as to the position of the mobile communication terminal 90 from the exchange 71 and the base station 80, that is, a signal for inquiring the location area ID of the location area where the mobile communication terminal 90 exists; and the like.

Moreover, Included in the signal transmitted from the location register 60 in accordance with the movement of the mobile communication terminal 90 are: a signal of a response to the position registration request to the mobile communication terminal 90, that is, a signal for notifying that the location area ID of the location area where the mobile communication terminal 90 exists is registered and the position registration has been performed in accordance with the position registration request and for notifying the mobile characteristic number of the mobile communication terminal 90 (hereinafter referred to as a "position registration response signal"); a signal of a response to the inquiry for the position of the mobile communication terminal 90 to the exchange 71 or the base station 80, that is, a signal for notifying the location area ID of the location area where the mobile communication terminal 90 exists; and the like.

The communication interface 64 receives a signal from the mobile communication terminal 90, the exchange 71 or the base station 80 via the exchange network 70 and transmits a signal to the mobile communication terminal 90, the exchange 71 or the base station 80. The communication interface 64 provides the received signal to the mobility control unit 65. Moreover, the communication interface 64 transmits a signal as the mobility control unit 65 instructs.

The mobility control unit 65 performs mobility control of the mobile communication terminal 90. Specifically, the mobility control unit 65 performs a processing in accordance with the movement of the mobile communication terminal 90. Moreover, the mobility control unit 65 performs the processing based on a command of the advanced processing unit 67. The mobility control unit 65 performs a basic processing among the position registration of the mobile communication terminal 90 and the response to the inquiry for the position of the mobile communication terminal 90 from the base station 80 or the exchange 71. For example, the mobility control unit 65 performs a processing of registering a cell ID or a location area ID in the home memory 63 and updating the registered data. Moreover, the mobility control unit 65 performs a processing of searching in the home memory 63 based on a mobile communication terminal ID and notifying a position of the mobile communication terminal 90 to the base station 80 and the exchange 71. Furthermore, the mobility control unit 65 performs a processing of notifying to the base station 80 a location area ID of a location area allocated to a cell covered by the base station. Thus, the mobility control unit 65 controls the data related to the mobile communication terminal 90 stored in the home memory 63. Moreover, the mobility control unit 65 performs a processing of instructing the communication interface 64 to transmit a signal to the mobile communication terminal 90, the base station 80 or the exchange 71 and a processing of obtaining a signal from the mobile communication terminal 90, the base station 80 or the exchange 71 from the communication interface 64.

The mobility control unit 65 includes a network position registration processing sub-unit 65*a*. The network position registration processing sub-unit 65*a* performs registration and updating of the data stored in the home memory 63 by registering and updating the cell ID and the location area ID where the mobile communication terminal 90 exists, and the time of the registration and the update in the home memory 63.

The mobility control unit 65 has a function of understanding the location area ID of the mobile characteristic number #1. Thus, when the mobile characteristic of the mobile communication terminal 90 is the mobile characteristic number #1, the network position registration processing sub-unit 65*a* can obtain the location area ID of the location area where the mobile communication terminal 90 exists by searching through the location area control table 62 based on the mobile characteristic number #1 and the cell ID and can register the obtained location area ID in the home memory 63. On the other hand, the mobility control unit 65 cannot understand the location area IDs of the mobile characteristic numbers #2 and #3. Therefore, when the mobile characteristic of the mobile communication terminal 90 is the mobile characteristic number #2 or #3, the network position registration processing sub-unit 65*a* obtains the location area ID of the location area where the mobile communication terminal 90 exists from the advanced processing unit 67. Then, the network position registration processing sub-unit 65*a* registers the obtained location area ID in the home memory 63 based on the advanced processing unit 67 commands. Moreover, the mobility control unit 65 generates a position registration response signal to be transmitted to the mobile communication terminal 90 of the mobile characteristic number #1.

Moreover, the mobility control unit 65 generates a notification related to the processing performed by the mobility control unit 65. The processing taken as a cue to generate the notification is specifically referred to as a first processing. Included in the notification related to the first processing performed by the mobility control unit 65 are: a notification related to data update actively performed by the mobility control unit 65; and a notification related to the occurrence of events detected by the mobility control unit 65, such as reception of a signal by the mobility control unit 65 and the like.

The advanced processing unit 67 is a processing unit configured to perform a processing different from the first processing performed by the mobility control unit 65 (hereinafter referred to as a "second processing), based on the notification related to the first processing. Taking the notification related to the first processing performed by the mobility control unit 65 as a cue, the advanced processing unit 67 performs the second processing. Moreover, the advanced processing unit 67 also functions as an instruction unit configured to generate a command to the mobility control unit 65. Thus, the advanced processing unit 67 realizes a mobility control function that the mobility control unit 65 does not have.

For example, the second processing performed by the advanced processing unit 67 includes the following. Based on the movement speed of the mobile communication terminal 90, the advanced processing unit 67 finds out the type of mobile characteristics of the mobile communication terminal 90. Specifically, the advanced processing unit 67 searches through the mobile characteristic table 61 based on the movement speed and finds out the mobile characteristic number of the mobile communication terminal 90. Moreover, when the found out mobile characteristic of the mobile communication terminal 90 is the mobile characteristic number #2 or #3, the advanced processing unit 67 searches through the location area control table 62 based on the cell ID and the mobile characteristic number #2 or #3 and finds out the location area ID of the location area where the mobile communication terminal 90 exists. Moreover, the advanced processing unit 67 generates a position registration response signal to the mobile communication terminal 90 of the mobile characteristic number #2 or #3.

Moreover, the command generated by the advanced processing unit 67 includes the following. When the obtained mobile characteristic of the mobile communication terminal is the mobile characteristic number #2 or #3, the advanced processing unit 67 notifies the location area ID to the mobility control unit 65 and generates a command that instructs that register the location area ID in the home memory 63. As described above, the mobility control unit 65 has the function of understanding the location area ID of the mobile characteristic number #1. Therefore, when the mobile characteristic of the mobile communication terminal 90 is the mobile characteristic number #1, the advanced processing unit 67 notifies that the mobile characteristic of the mobile communication terminal 90 is the mobile characteristic number #1, and generates the command for instructing that search the location area ID through the location area control table 62, and register the location area ID in the home memory 63.

The programming interface 66 is a notification providing unit configured to obtain the notification generated by the mobility control unit 65 from the mobility control unit 65 and for provide the obtained notification to the advanced processing unit 67. Moreover, the programming interface 66 also functions as a command providing unit configured to obtain the command generated by the advanced processing unit 67 from the advanced processing unit 67 and provide the obtained command to the mobility control unit 65. Specifically, the programming interface 66 performs reception/transmission of the notification and the command between the mobility control unit 65 and the advanced processing unit 67.

Figure 9:
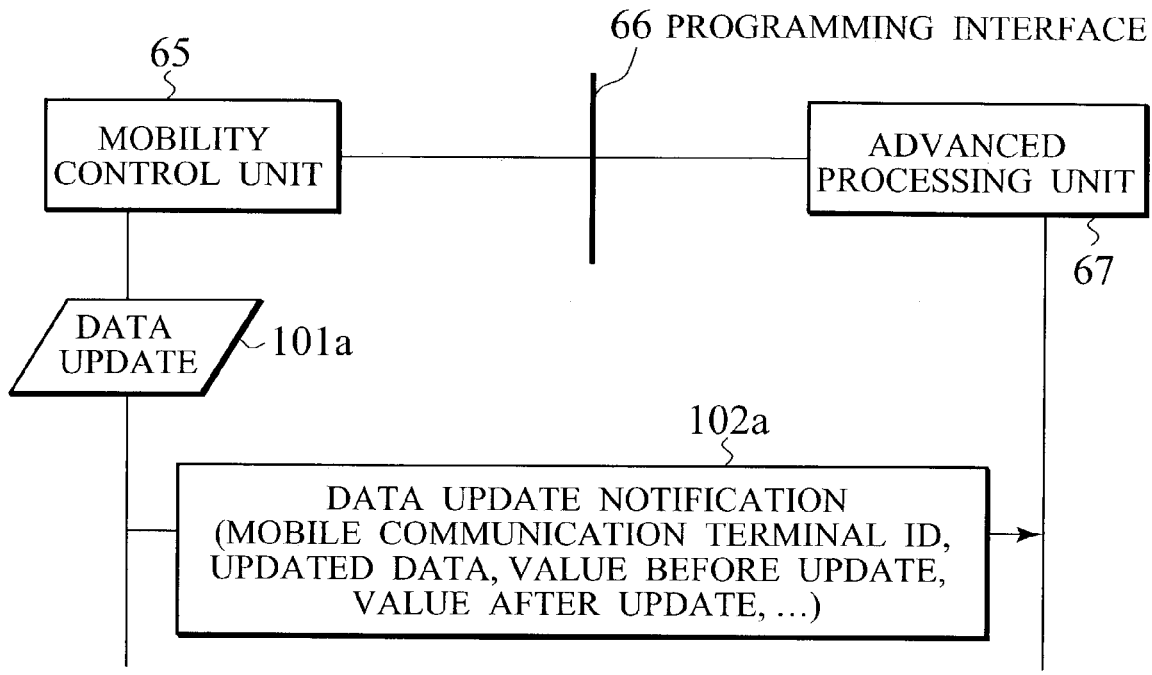
FIG. 9 is a view showing an operation of data update performed by a mobility control unit of the location register, according to the embodiment of the present invention.

The mobility control unit 65, the programming interface 66 and the advanced processing unit 67 perform the processing, the generation of the notification and the command and the reception/transmission of the notification and the command, for example, as below. FIG. 9 shows an operation of data update performed by the mobility control unit 65 of the location register 60. For example, when the mobility control unit 65 performs the first processing that update information related to the mobile communication terminal 90, the information being stored in the home memory 63 by updating the location area ID and the cell ID in accordance with the movement of the mobile communication terminal 90 (101*a*), the mobility control unit 65 generates a data update notification (102*a*). Then, the programming interface 66 obtains the data update notification from the mobility control unit 65 and provides the notification to the advanced processing unit 67. The data update notification notifies information related to the data update. Included in the data update notification are: the mobile communication terminal ID of the mobile communication terminal 90 as the subject of the data update, types of the updated data, such as the location area ID, the cell ID and the like; values before the data update; values after the data update; and the like. Taking such a data update notification as a cue, the advanced processing unit 67 performs a predetermined command, performs the second processing or performs the predetermined command as a result of the second processing.

Figure 10:
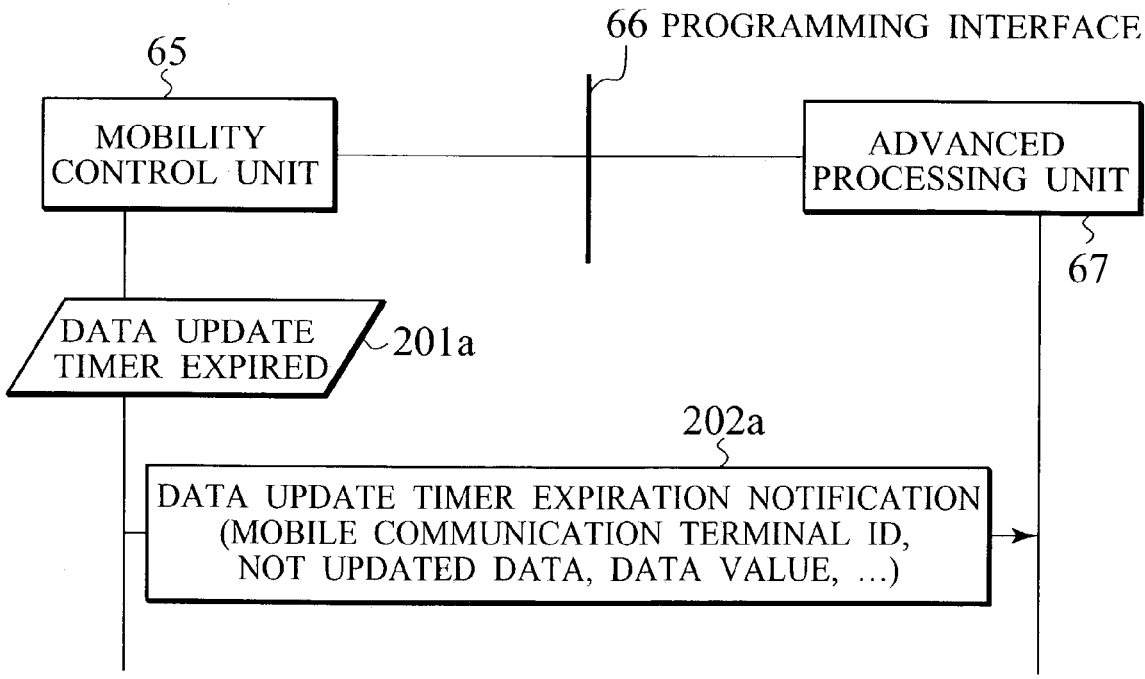
FIG. 10 is a view showing an operation when the mobility control unit of the location register does not perform the data update for a predetermined period, according to the embodiment of the present invention.

FIG. 10 shows an operation when the mobility control unit 65 of the location register 60 does not perform the data update for a predetermined period. The timer 68 is activated when the mobility control unit 65 lastly performs the data update of the cell ID, the location area ID and the like controlled by the mobility control unit 65. The timer 68 is set to be stopped on the expiration of a predetermined period previously set. The timer 68 is reset if the data update is performed before the expiration of the predetermined period. When the mobility control unit 65 performs the first processing of detecting that the timer 68 has stopped on the expiration of the predetermined period (201*a*), the mobility control unit 65 generates a data update timer expiration notification for notifying that the data update has not been performed for the predetermined period (202*a*). Then, the programming interface 66 obtains the data update timer expiration notification from the mobility control unit 65 and provides the notification to the advanced processing unit 67. Included in the data update timer expiration notification are: a mobile communication terminal ID of the mobile communication terminal 90, which is not updated; types of data, which are not updated, such as the location area ID, the cell ID and the like; values of data stored without being updated; and the like. Taking such a data update timer expiration notification as a cue, the advanced processing unit 67 performs a predetermined command, performs the second processing or performs the predetermined command as a result of the second processing.

Figure 11:
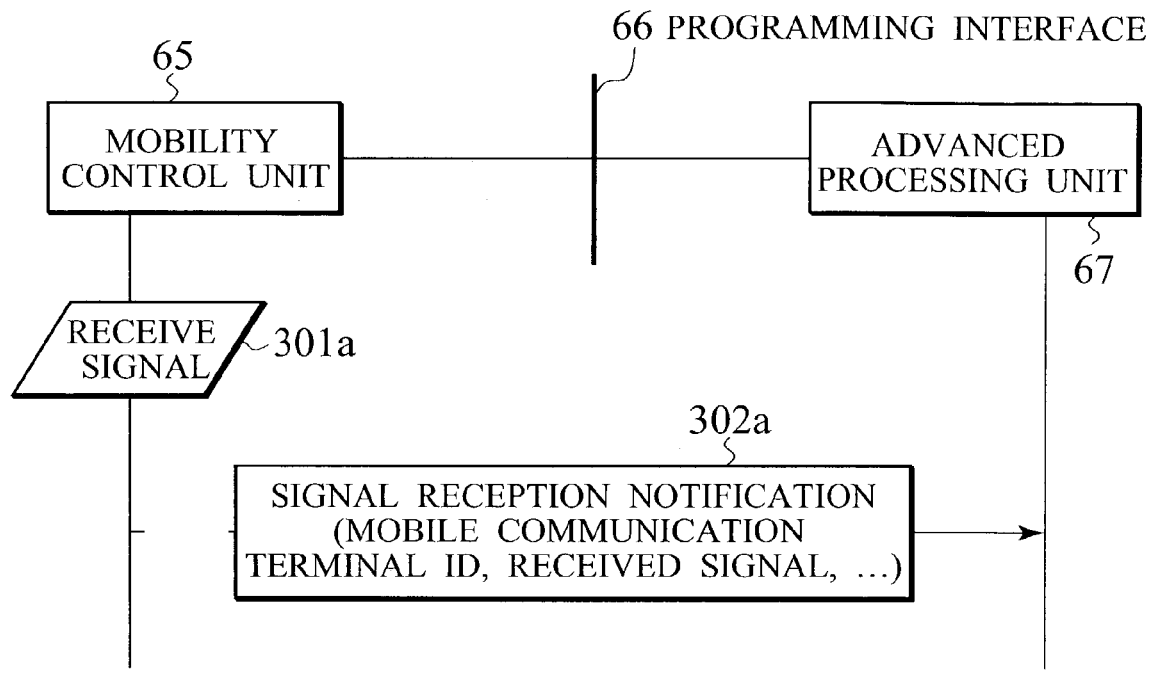
FIG. 11 is a view showing an operation when the mobility control unit of the location register obtains a signal, according to the embodiment of the present invention.

FIG. 11 shows an operation when the mobility control unit 65 of the location register 60 obtains a signal. For example, when the communication interface 64 receives a signal such as a position registration request signal transmitted from the mobile communication terminal 90 in accordance with the movement of the mobile communication terminal 90, and the mobility control unit 65 performs the first processing of obtaining the received signal from the communication interface 64 (301*a*), the mobility control unit 65 generates a signal reception notification (302*a*). Then, the programming interface 66 obtains the signal reception notification from the mobility control unit 65 and provides the notification to the advanced processing unit 67. The signal reception notification notifies information related to reception of the signal. Included in the signal reception notification are: a mobile communication terminal ID or a data for identifying the exchange 71 or the base station 80, which indicates a source of the transmitted signal; the received signal itself; and the like. Taking such a signal reception notification as a cue, the advanced processing unit 67 performs a predetermined command, performs the second processing or performs the predetermined command as a result of the second processing.

Note that the mobility control unit 65 can determine a type of a specific signal for generating the signal reception notification and can store the type. The mobility control unit 65 compares the signal obtained from the communication interface 64 with the stored type of the specific signal. When the both coincide with each other, the mobility control unit 65 may generate the signal reception notification, and when the both do not coincide with each other, the mobility control unit 65 may not generate the signal reception notification.

Figure 12:
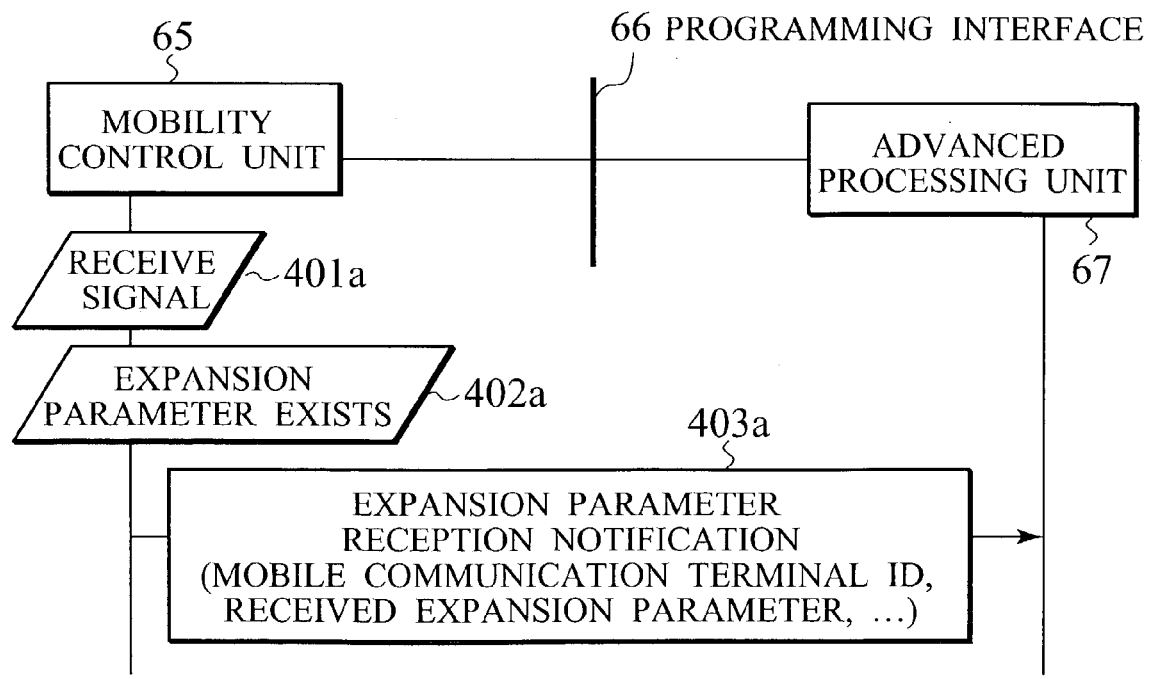
FIG. 12 is a view showing an operation when the mobility control unit of the location register obtains a signal including an expansion parameter, according to the embodiment of the present invention.

FIG. 12 shows an operation when the mobility control unit 65 of the location register 60 obtains a signal including an expansion parameter. For example, in accordance with the movement of the mobile communication terminal 90, the communication interface 64 receives a signal such as the position registration request signal transmitted from the mobile communication terminal 90, and the mobility control unit 65 obtains the received signal from the communication interface 64 (401*a*). The mobility control unit 65 stores types of data used in the processing performed by the mobility control unit 65 in advance. The mobility control unit 65 compares the received signal with the type of data and determines whether or not an expansion parameter other than the type of data is included in the received signal. The mobility control unit 65 performs the first processing including such obtainment of the received signal and determination thereof. When the expansion parameter exists in the received signal (402*a*), the mobility control unit 65 generates an expansion parameter reception notification for notifying information related to the expansion parameter (403*a*).

Then, the programming interface 66 obtains the expansion parameter reception notification from the mobility control unit 65 and provides the notification to the advanced processing unit 67. Included in the expansion parameter reception notification are: a mobile communication terminal ID or data for identifying the exchange 71 or the base station 80, which indicates a source of the transmitted signal; the received expansion parameter; and the like. Taking such a expansion parameter reception notification as a cue, the advanced processing unit 67 performs the second processing such as finding out the mobile characteristic of the mobile communication terminal 90, performs a predetermined command or performs the predetermined command as a result of the second processing.

Figure 13:
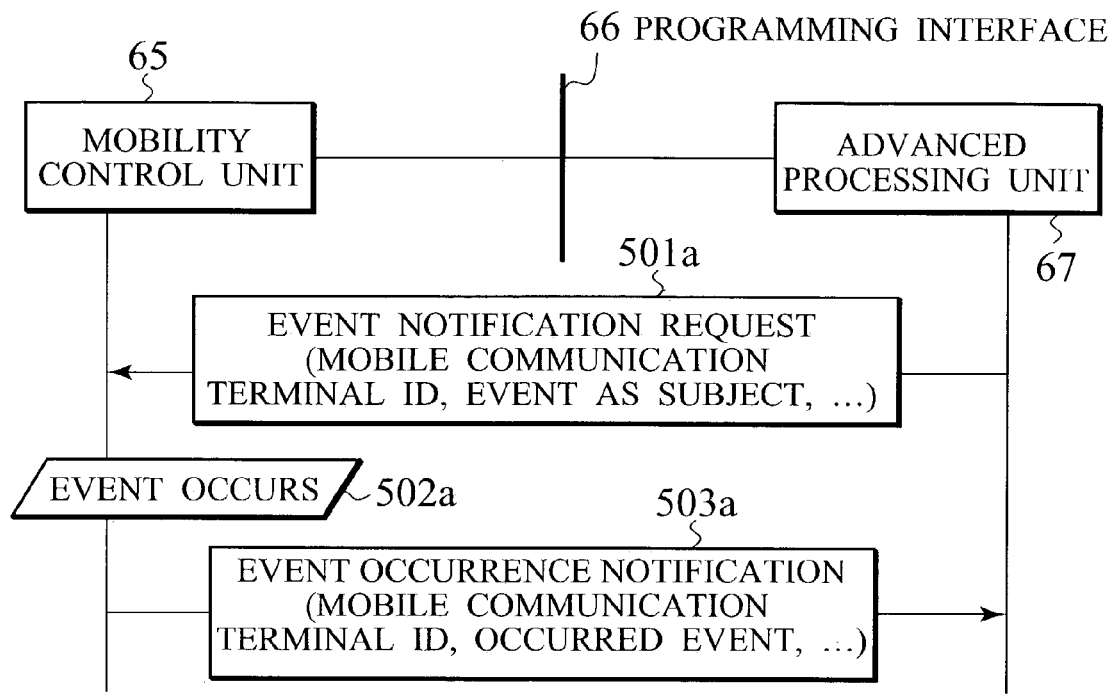
FIG. 13 is a view showing an operation when an advanced processing unit of the location register instructs an event notification to a mobility control unit, according to the embodiment of the present invention.

FIG. 13 shows an operation when the advanced processing unit 67 of the location register 60 instructs an event notification to the mobility control unit 65. When a predetermined event occurs in accordance with the movement of the mobile communication terminal 90, the advanced processing unit 67 generates an event notification request as a command for instructing the mobility control unit 65 to notify the occurrence of the predetermined event (501*a*). Then, the programming interface 66 obtains the event notification request from the advanced processing unit 67 and provides the request to the mobility control unit 65. Included in the event notification request are: a mobile communication terminal ID of the mobile communication terminal 90 as the subject; a type of an event for which a notification is requested; and the like. As the events are, for example: update of data, such as the location area ID, the cell ID and the like, which is controlled by the mobility control unit 65; reception of signals; and the like.

When such an event notification request is made, the mobility control unit 65 monitors the occurrence of the event to be notified according to the event notification request. Then, for example, when the event to be notified occurs, such as the data update, the reception of signals or the like (502*a*), the mobility control unit 65 generates an event occurrence notification (503*a*). The programming interface 66 obtains the event occurrence notification from the mobility control unit 65 and provides the notification to the advanced processing unit 67. The event occurrence notification notifies the occurrence of event. Included in the event occurrence notification are: the mobile communication terminal ID of the mobile communication terminal 90 as the subject of the event that occurred; a type and contents of the event that occurred; and the like.

Figure 14:
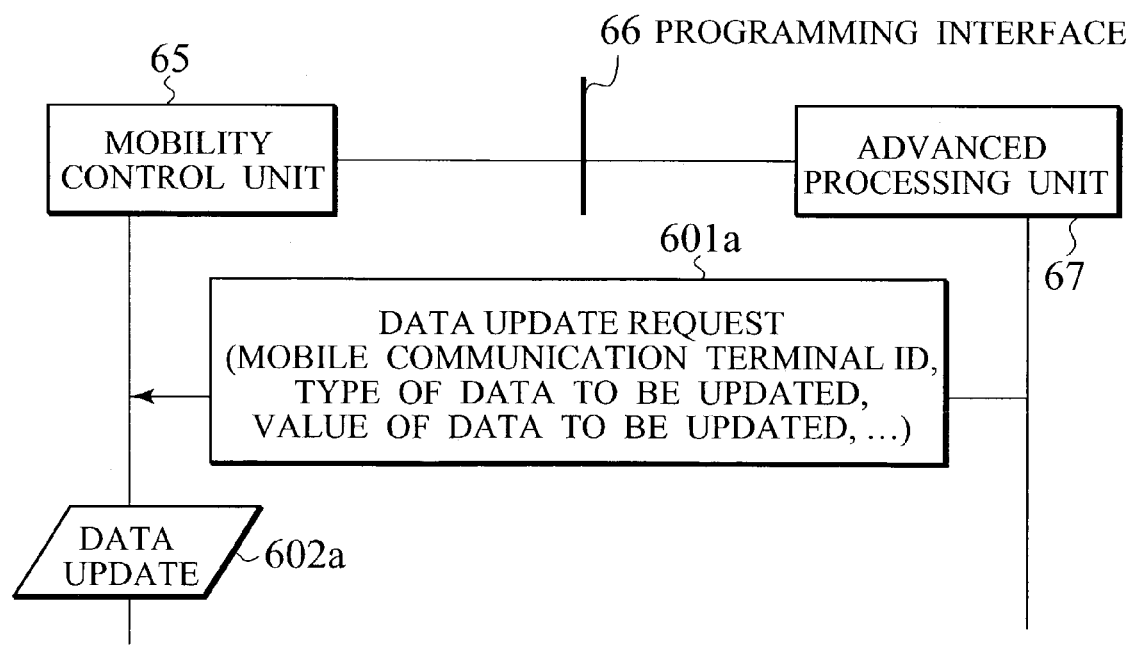
FIG. 14 is a view showing an operation when the advanced processing unit of the location register instructs data update to the mobility control unit, according to the embodiment of the present invention.

FIG. 14 shows an operation when the advanced processing unit 67 of the location register 60 instructs data update to the mobility control unit 65. The advanced processing unit 67 generates a data update request as a command for instructing the mobility control unit 65 to update the data controlled by the mobility control unit 65, for example, data stored in the home memory 63 and the like in accordance with the movement of the mobile communication terminal 90 (601*a*). The programming interface 66 obtains the data update request from the advanced processing unit 67 and provides the request to the mobility control unit 65. Included in the data update request are: the mobile communication terminal ID of the mobile communication terminal 90 as the subject; a type of data to be updated; values of data to be updated; and the like. Moreover, in the data update request, instead of the values of data to be updated, values of data for finding out the values of data to be updated may be included. For example, when the data to be updated is a location area ID, a mobile communication terminal ID of a mobile communication terminal 90, of which location area ID is to be updated, a location area ID to be updated and the like are included in the data update request. When the data update request is performed as described above, the mobility control unit 65 performs the data update in accordance with the data update request (602*a*).

Figure 15:
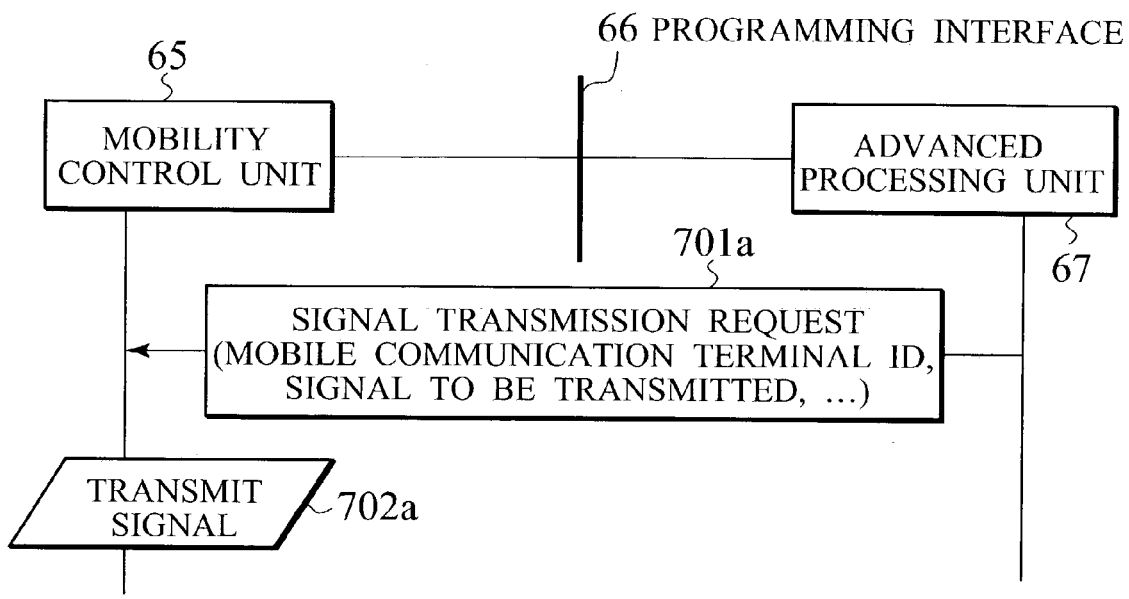
FIG. 15 is a view showing an operation when the advanced processing unit of the location register instructs transmission of a signal to the mobility control unit, according to the embodiment of the present invention.

FIG. 15 shows an operation where the advanced processing unit 67 of the location register 60 instructs transmission of a signal to the mobility control unit 65. The advanced processing unit 67 generates a signal transmission request as a command for instructing the mobility control unit 65 to transmit a signal in accordance with the movement of the mobile communication terminal 90 (701*a*). Then, the programming interface 66 obtains the signal transmission request from the advanced processing unit 67 and provides the request to the mobility control unit 65. In the signal transmission request, included are: a mobile communication terminal ID of the mobile communication terminal 90 as the subject to be transmitted, the signal to be transmitted and the like are included. For example, as the signal to be transmitted, there are a position registration response signal and the like. When the signal transmission request is performed as described above, the mobility control unit 65 instructs the communication interface 64 to transmit the signal in accordance with the signal transmission request. And the communication interface 64 transmits the signal (702*a*).

Figure 16:
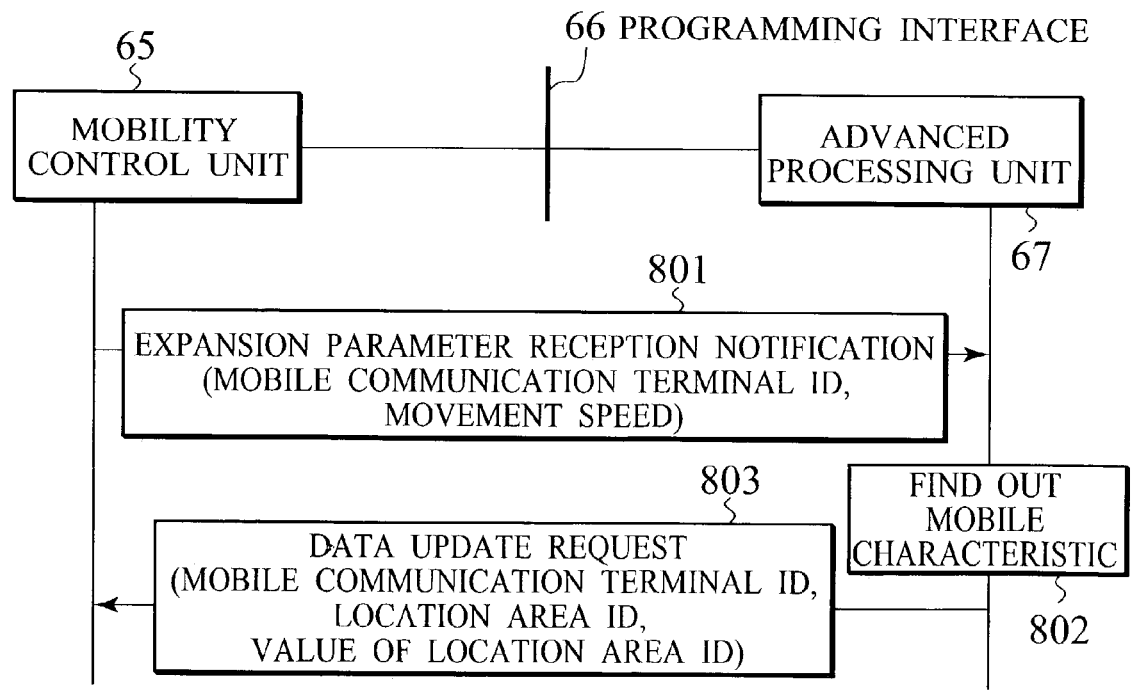
FIG. 16 is a view showing an operation of the advanced processing unit when an expansion parameter reception notification from the mobility control unit of the location register is taken as a cue, according to the embodiment of the present invention.

Taking the notification from the mobility control unit 65 as a cue, the advanced processing unit 67 may perform a series of operations to perform a processing and generate a command in accordance with the processing result. FIG. 16 shows an operation of the advanced processing unit 67 taking the expansion parameter reception notification from the mobility control unit 65 of the location register 60 as a cue. The communication interface 64 receives the position registration request signal including the movement speed of the mobile communication terminal 90, which is transmitted from the mobile communication terminal 90 in accordance with the movement of the mobile communication terminal 90, and the mobility control unit 65 obtains the received signal from the communication interface 64.

The mobility control unit 65 compares the received signal with the previously stored type of the data used in the processing performed by the mobility control unit 65, and determines whether or not the expansion parameter is included in the received signal. A processing of finding out a mobile characteristic from the movement speed is performed by the advanced processing unit 67 and is not performed by the mobility control unit 65. Therefore, the mobility control unit 65 determines that the position registration request signal including the movement speed includes the expansion parameter. Then, the mobility control unit 65 generates the expansion parameter reception notification (801). Then, the programming interface 66 obtains the expansion parameter reception notification from the mobility control unit 65 and provides the notification to the advanced processing unit 67. Herein, the expansion parameter reception notification includes: the mobile communication terminal ID of the mobile communication terminal 90 transmitting the position registration request signal; and the movement speed as the expansion parameter.

Taking the expansion parameter reception notification as a cue, the advanced processing unit 67 searches through the mobile characteristic table 61 to obtain the mobile characteristic of the mobile communication terminal 90 based on the movement speed included in the expansion parameter reception notification (802). The advanced processing unit 67 generates a data update request in accordance with the mobile characteristic number of the obtained mobile characteristic (803). Then, the programming interface 66 obtains the data update request from the advanced processing unit 67 and provides the request to the mobility control unit 65.

When the mobile characteristic is the mobile characteristic number #1, the mobile communication terminal ID as the subject of the mobile communication terminal 90, the location area ID as the type of the data to be updated, and the mobile characteristic number #1 in order for the mobility control unit 65 to obtain values of the location area ID to be updated is included in the data update request. When the mobile characteristic is the mobile characteristic number #2 or #3, based on the obtained mobile characteristic number and the cell ID of the base station 80 receiving the position registration request signal, the advanced processing unit 67 searches through the location area control table 62 and finds out the location area ID of the location area where the mobile communication terminal 90 exists. Then, the advanced processing unit 67 generates the data update request including the values of the mobile communication terminal ID as the subject of the mobile communication terminal 90, the location area ID as the type of the data to be updated and the location area ID to be updated.

As described above, when the mobility control unit 65 of the location register 60 receives the position registration request signal including the movement speed, the mobility control unit 65 generates the expansion parameter reception notification including the movement speed. Then, the programming interface 66 obtains the expansion parameter reception notification from the mobility control unit 65 and provides the notification to the advanced processing unit 67. The advanced processing unit 67 obtains the movement speed from the expansion parameter reception notification, and based on the movement speed, searches through the mobile characteristic table 61, thus enabling to find out the mobile characteristic of the mobile communication terminal 90, which is determined in accordance with the movement speed of the mobile communication terminal 90 as the second processing.

Accordingly, in accordance with the changing mobile characteristics depending on the movement speed of the mobile communication terminal 90, the location register 60 and the mobile communication terminal 90 can register the location area ID corresponding to the mobile characteristics and can perform mobility control of the mobile communication terminal 90 by adding only the advanced processing units 67 and 95 without changing the mobility control units 65 and 92 themselves.

(Mobile Communication Terminal)

Figure 17:
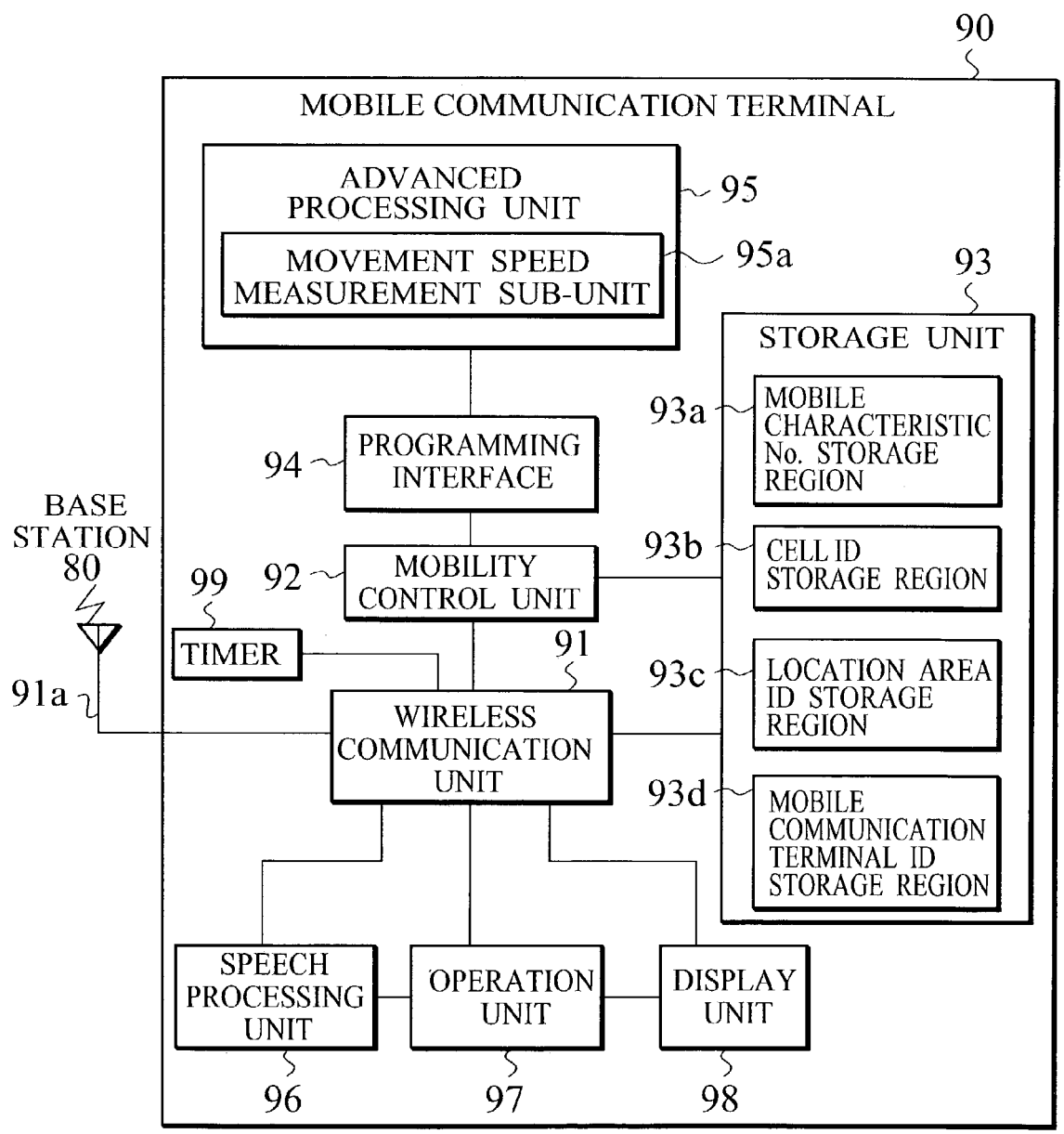
FIG. 17 is a block diagram showing a configuration of the mobile communication terminal according to the embodiment of the present invention.

Next, detailed description will be given for the mobile communication terminal 90. The mobility control performed by the mobile communication terminal 90, that is, the processing performed in accordance with the movement thereof includes a position registration request and update of a location area ID and a cell ID, which indicate a position the mobile communication terminal exists. As shown in FIG. 17, the mobile communication terminal 90 comprises: a wireless communication unit 91, a mobility control unit 92, a storage unit 93, a programming interface 94, an advanced processing unit 95, a speech processing unit 96, an operation unit 97, a display unit 98 and a timer 99.

The wireless communication unit 91 includes an antenna 91*a* and controls wireless data communication performed with the base station 80. The wireless communication unit 91 generates a wireless signal for transmitting voice data for speech and packet data and the like. The wireless communication unit 91 transmits the wireless signal to the base station 80 via the antenna 91*a*. Moreover, the wireless communication unit 91 receives the signal including the voice data for speech and packet data and the like, the signal being transmitted from the base station 80, via the antenna 91*a* and obtains the voice data and packet data by demodulating the received signal. The wireless communication unit 91 provides the voice data and packet data to the speech processing unit 96 and the display unit 98.

Moreover, the wireless communication unit 91 is a reception unit configured to receive a signal transmitted to the mobile communication terminal 90 in accordance with the movement of the mobile communication terminal 90 as well as a transmission unit configured to transmit a signal from the mobile communication terminal 90 in accordance with the movement of the mobile communication terminal 90. Included in the signal transmitted to the mobile communication terminal 90 in accordance with the movement of the mobile communication terminal 90 are: a position registration response signal from the location register 60; a signal of broadcast information for broadcasting a cell ID of a cell covered by the base station 80 and a location area ID of a location area corresponding to each mobile characteristic number allocated to the cell to the mobile communication terminal 90 existing in the cell (hereinafter referred to as a "broadcast information signal"); and the like. Note that the broadcast information signal is transmitted when the base station 80 receives from the location register 60 a notification of the cell ID of the cell covered by the base station 80 and the location area ID of the location area allocated to the cell. Moreover, the signal transmitted from the mobile communication terminal 90 in accordance with the movement of the mobile communication terminal 90 includes a position registration request signal and the like.

The wireless communication unit 91 provides the mobility control unit 92 with a signal including information necessary for the mobility control, such as the position registration response signal received from the base station 80 or the location register 60, the broadcast information signal and the like. Moreover, in accordance with an instruction of the mobility control unit 92, the wireless communication unit 91 transmits the signal including information related to the mobility control of the location register 60 and the like.

The speech processing unit 96 has, for example, a microphone, a speaker, a voice processing sub-unit and the like and performs speech processing including a call connection/disconnection processing. The operation unit 96 includes a plurality of keys for inputting numerals, characters, operation instructions and the like and outputs an operation signal corresponding to an operation of those keys to the wireless communication unit 91, the speech processing unit 96 and the like. The display unit 98 has a liquid crystal display panel and the like, and a drive circuit for performing display control of the liquid crystal display panel and the like.

The storage unit 93 stores data. As data changes in accordance with the movement of the mobile communication terminal 90, the storage unit 93 stores data such as the mobile characteristic number, the cell ID indicating the position where the mobile communication terminal 90 exists, the location area ID and the like. Moreover, the storage unit 93 stores a mobile communication terminal ID and the like as another data related to the mobile communication terminal 90. The storage unit 93 comprises: a mobile characteristic number storage region 93a where mobile characteristic number is stored; a cell ID storage region 93b where cell ID is stored; a location area ID storage region 93c where location area ID is stored; and a mobile communication terminal ID storage region 93d where mobile communication terminal ID is stored. In the mobile characteristic number storage region 93a, the cell ID storage region 93b and the location area ID storage region 93c, data of which values change in accordance with the movement of the mobile communication terminal 90 is stored and updated. Thus, the mobile characteristic number storage region 93a, the cell ID storage region 93b and the location area ID storage region 93c are electrically rewritable and are provided in an Electrical Erasable Programmable Read Only Memory (EEPROM) and the like, which is a nonvolatile memory. Moreover, in the mobile communication terminal ID storage region 93a, the mobile communication terminal ID is stored in advance.

The mobility control unit 92 performs the mobility control of the mobile communication terminal 90. Specifically, the mobility control unit 92 performs a processing in accordance with the movement of the mobile communication terminal 90. The mobility control unit 92 performs basic processing for mobility control. For example, the mobility control unit 92 performs a processing of instructing transmission of a position registration request signal to the wireless communication unit 91 and a processing of obtaining from the wireless communication unit 91 signals, which are transmitted from the base station 80 and the location register 60, such as a position registration response signal, a broadcast information signal and the like.

Moreover, the mobility control unit 92 obtains a mobile characteristic number from the position registration response signal, registers the mobile characteristic number in the mobile characteristic number storage region 93a and performs a processing to update a value of the mobile characteristic number, when the mobile characteristic number of the mobile communication terminal 90 changes.

Moreover, the mobility control unit 92 obtains a cell ID from the broadcast information signal, registers the cell ID of the cell where the mobile communication terminal 90 exists in the cell ID storage region 93b and performs a processing of updating a number of the cell ID as the cell where the mobile communication terminal 90 exists changes in accordance with the movement of the mobile communication terminal 90.

Moreover, the mobility control unit 92 obtains a mobile characteristic number from the position registration response signal, that is, a mobile characteristic number of the current mobile communication terminal 90. Here, the mobility control unit 92 has a function of understanding the location area ID of the mobile characteristic number #1. Thus, when the mobile characteristic of the mobile communication terminal 90 is the mobile characteristic number #1, the mobility control unit 92 obtains, based on the mobile characteristic number #1, a location area ID of a location area corresponding to the mobile characteristic number #1 allocated to the cell where the mobile communication terminal 90 currently exists from the broadcast information. Then, the mobility control unit 92 registers the location area ID of the location area where the mobile communication terminal 90 exists in the location area ID storage region 93c and performs a processing of updating a value of the location area ID, when the location area where the mobile communication terminal exists changes in accordance with the movement of the mobile communication terminal 90.

On the other hand, the mobility control unit 92 cannot understand location area IDs of the mobile characteristic numbers #2 and #3. Thus, when the mobile characteristic of the mobile communication terminal 90 is the mobile characteristic number #2 or #3, the mobility control unit 92 obtains from the advanced processing unit 95 the location area ID of the location area where the mobile communication terminal 90 exists. Then the mobility control unit 92 registers the location area ID of the location area where the mobile communication terminal 90 exists in the location area ID storage region 93c and performs a processing of updating a value of the location area ID, when the location area where the mobile communication terminal 90 exists changes in accordance with the movement of the mobile communication terminal 90, based on a command of the advanced processing unit 95. Accordingly, the mobility control unit 92 controls the data related to the mobile communication terminal 90, the data being stored in the storage unit 93.

Moreover, the mobility control unit 92 generates a notification related to the processing performed by the mobility control unit 92. The processing taken as a cue to generate the notification is particularly called a first processing. Included in the notification related to the first processing performed by the mobility control unit 92 are: a notification related to data update actively performed by the mobility control unit 92; and a notification related to the occurrence of events detected by the mobility control unit 92, such as the reception of a signal by the mobility control unit 92 and the like.

The advanced processing unit 95 is a processing unit configured to perform a processing different from the first processing performed by the mobility control unit 92 (hereinafter referred to as a "second processing"), based on the notification related to the first processing. Taking the notification related to the first processing performed by the mobility control unit 92 as a cue, the advanced processing unit 95 performs the second processing. Moreover, the advanced processing unit 95 also functions as an instruction unit configured to generate a command to the mobility control unit 92. Thus, the advanced processing unit 95 realizes a mobility control function that the mobility control unit 92 does not have.

For example, the second processing performed by the advanced processing unit 95 includes the following. The advanced processing unit 95 comprises a movement speed measurement sub-unit 95a configured to measure a movement speed of the mobile communication terminal 90. Then, the movement speed measurement sub-unit 95a performs a processing of measuring the movement speed. The advanced processing unit 95 generates a position registration request signal including the movement speed measured by the movement speed measurement sub-unit 95a. Moreover, when the mobile characteristic of the mobile communication terminal 90, which is included in the position registration response signal, is the mobile characteristic number #2 or #3, the advanced processing unit 95 obtains from the broadcast information, based on the mobile characteristic number #2 or #3, a location area ID of a location area corresponding to the mobile characteristic number #2 or #3 allocated to the cell where the mobile communication terminal 90 currently exists.

Moreover, the command generated by the advanced processing unit 95 includes the following. When the mobile characteristic included in the position registration response signal is the mobile characteristic number #2 or #3, the advanced processing unit 95 notifies the location area ID to the mobility control unit 92, registers the location area ID in the location area ID storage region 93c and generates a command that instructs data update.

The programming interface 94 is a notification providing unit configured to obtain the notification generated by the mobility control unit 92 from the mobility control unit 92 and provide the obtained notification to the advanced processing unit 95. Moreover, the programming interface 94 also functions as a command providing unit configured to obtain the command generated by the advanced processing unit 95 from the advanced processing unit 95 and provide the obtained command to the mobility control unit 92. Specifically, the programming interface 94 performs reception/transmission of the notification and the command between the mobility control unit 92 and the advanced processing unit 95.

The mobility control unit 92, the programming interface 94 and the advanced processing unit 95 perform the processing, the generation of the notification and the command and the reception/transmission of the notification and the command, for example, as below. FIG. 18 shows an operation of data update performed by the mobility control unit 92 of the mobile communication terminal 90. For example, when the mobility control unit 92 performs the first processing that update data changing in accordance with the movement of the mobile communication terminal 90, the data being stored in the storage unit 93 by updating the location area ID, the cell ID and the like in accordance with the movement of the mobile communication terminal 90 (101b), the mobility control unit 92 generates a data update notification (102b). Then, the programming interface 94 obtains the data update notification from the mobility control unit 92 and provides the notification to the advanced processing unit 95. The data update notification notifies information related to the data update. In the data update notification, included are: types of the updated data such as the location area ID, the cell ID and the mobile characteristic number; values before the data update; values after the data update; and the like. Taking such a data update notification as a cue, the advanced processing unit 95 performs a second processing such as measurement of the movement speed of the mobile communication terminal 90, performs a predetermined command, or performs the predetermined command as a result of the second processing.

FIG. 19 shows an operation when the mobility control unit 92 of the mobile communication terminal 90 does not perform the data update for a predetermined period. The timer 99 is activated when the mobility control unit 92 lastly performs the data update of the mobile characteristic number, the cell ID, the location area ID and the like controlled by the mobility control unit 92. The timer 99 is set to be stopped on the expiration of a predetermined period previously set. The timer 99 is reset if the data update is performed before the expiration of the predetermined period. When the mobility control unit 92 performs the first processing of detecting that the timer 99 is stopped on the expiration of the predetermined period (201b), the mobility control unit 92 generates a data update timer expiration notification for notifying that the data update has not been performed for the predetermined period (202b). Then, the programming interface 94 obtains the data update timer expiration notification from the mobility control unit 92 and provides the notification to the advanced processing unit 95. Included in the data update timer expiration notification are: types of data, which are not updated, such as a location area ID, a cell ID, a mobile characteristic number and the like; values of data stored without being updated; and the like. Taking such a data update timer expiration notification as a cue, the advanced processing unit 95 performs a predetermined command, performs the second processing or performs the predetermined command as a result of the second processing.

Figure 20:
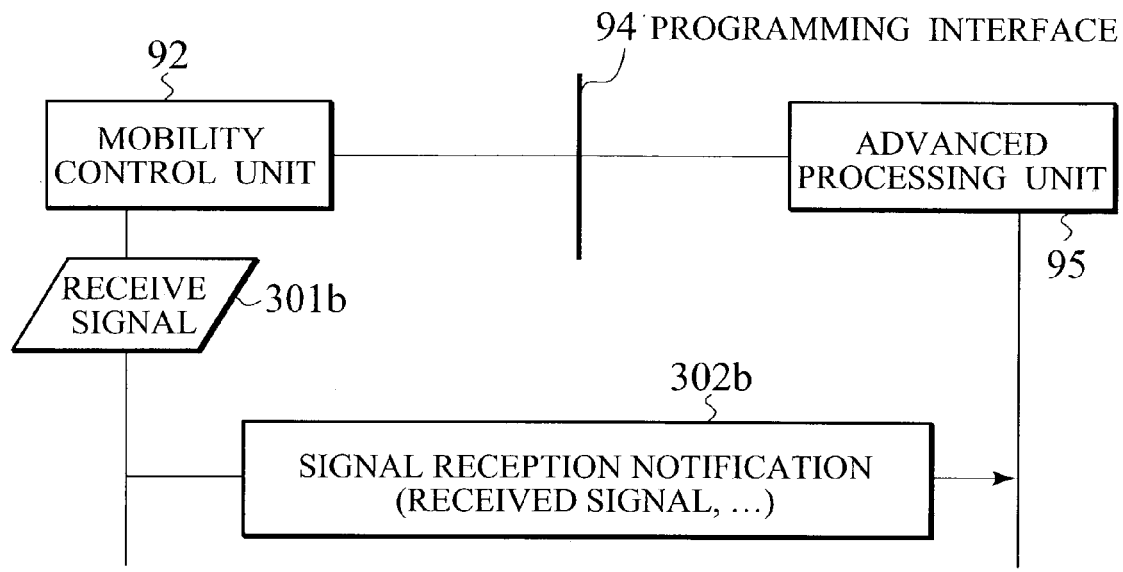
FIG. 20 is a view showing an operation when the mobility control unit of the mobile communication terminal obtains a signal, according to the embodiment of the present invention.

FIG. 20 shows an operation when the mobility control unit 92 of the mobile communication terminal 90 obtains a signal. For example, when the wireless communication unit 91 receives signals such as the broadcast information signal and the position registration response signal transmitted from the base station 80 and the location register 60, and the mobility control unit 92 performs the first processing of obtaining the received signal from the wireless communication unit 91 in accordance with the movement of the mobile communication terminal 90 (301b), the mobility control unit 92 generates a signal reception notification (302b). Then, the programming interface 94 obtains the signal reception notification from the mobility control unit 92 and provides the notification to the advanced processing unit 95. The signal reception notification notifies information related to reception of the signal. In the signal reception notification, the received signal itself and the like are included. Taking such a signal reception notification as a cue, the advanced processing unit 95 performs a second processing of finding out a location area ID corresponding to the mobile characteristic number of the mobile communication terminal 90 and the like, performs a predetermined command, or performs the predetermined command as a result of the second processing.

Note that the mobility control unit 92 can determine a type of a specific signal for generating the signal reception notification and can store the type. The mobility control unit 92 compares the signal obtained from the wireless communication unit 91 with the stored type of the specific signal. When they both coincide with each other, the mobility control unit 92 generates the signal reception notification, and when they do not coincide with each other, the mobility control unit 92 does not generate the signal reception notification.

Figure 21:
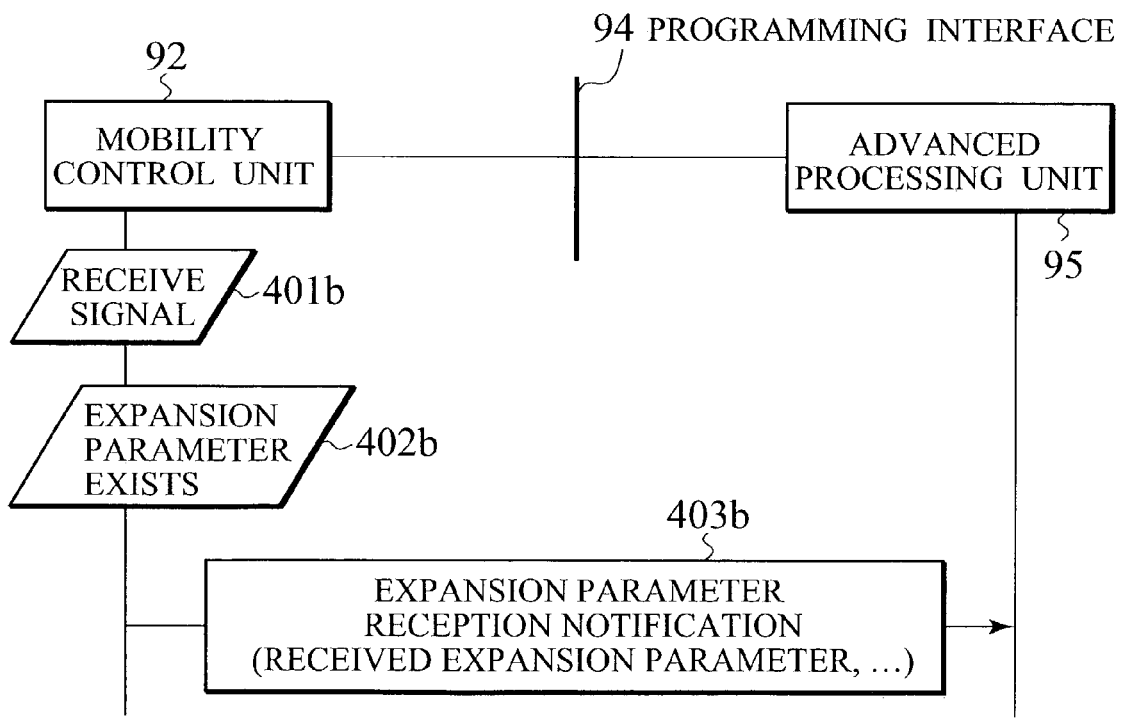
FIG. 21 is a view showing an operation when the mobility control unit of the mobile communication terminal obtains a signal including an expansion parameter, according to the embodiment of the present invention.

FIG. 21 shows an operation when the mobility control unit 92 of the mobile communication terminal 90 obtains a signal including an expansion parameter. For example, in accordance with the movement of the mobile communication terminal 90, the wireless communication unit 91 receives a signal such as the broadcast information signal transmitted from the base station 80 and the position registration response signal transmitted from the location register 60, and the mobility control unit 92 obtains the received signal from the wireless communication unit 91 (401b). The mobility control unit 92 stores types of data used in the processing performed by the mobility control unit 92 in advance. The mobility control unit 92 compares the received signal with the stored type of data and determines whether or not an expansion parameter other than the type of data is included in the received signal. The mobility control unit 92 performs the first processing including such obtainment of the received signal and determination thereof. When the expansion parameter exists in the received signal (402b), the mobility control unit 92 generates an expansion parameter reception notification for notifying information related to the expansion parameter (403b). Then, the programming interface 94 obtains the expansion parameter reception notification from the mobility control unit 92 and provides the notification to the advanced processing unit 95. The received expansion parameter and the like are included in the expansion parameter reception notification.

The expansion parameter includes, for example, the following: processing for finding out a location area where the mobile communication terminal 90 exists from the mobile characteristic numbers #2 and #3 included in the position registration response signal, by using location area IDs having "2" and "3" in the hundred's place, corresponding to the mobile characteristic numbers #2 and #3 included in the broadcast information signal is the one performed by the advanced processing unit 95 and is not the one performed by the mobility control unit 92. Thus, the location area IDs having "2" and "3" in the hundred's place, which are included in the broadcast information signal, and the mobile characteristic numbers #2 and #3 included in the position registration response signal are the expansion parameters. Taking such a expansion parameter reception notification as a cue, the advanced processing unit 95 performs a predetermined command such as update of the location area ID, performs the second processing, and performs the predetermined command as a result of the second processing.

Figure 22:
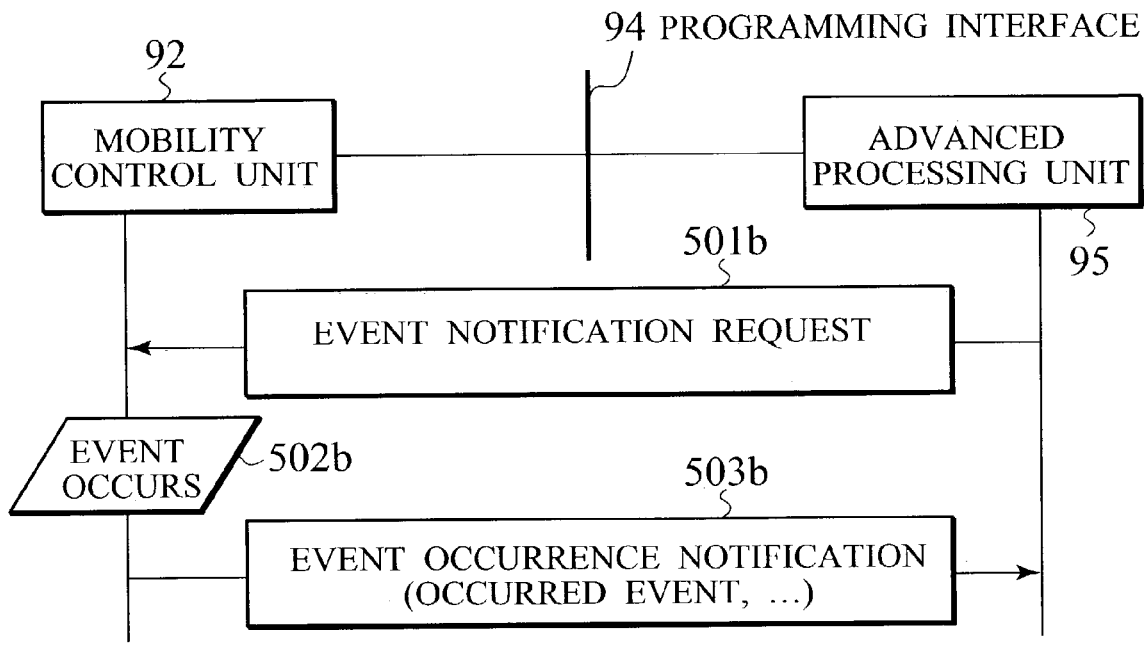
FIG. 22 is a view showing an operation when an advanced processing unit of the mobile communication terminal instructs an event notification to the mobility control unit, according to the embodiment of the present invention.

FIG. 22 shows an operation when the advanced processing unit 95 of the mobile communication terminal 90 instructs an event notification to the mobility control unit 92. When a predetermined event occurs in accordance with the movement of the mobile communication terminal 90, the advanced processing unit 95 generates an event notification request as a command for instructing the mobility control unit 92 to notify the occurrence of the predetermined event (501b). Then, the programming interface 94 obtains the event notification request from the advanced processing unit 95 and provides the request to the mobility control unit 92. In the event notification request, a type of an event for which a notification is requested and the like are included. As the events are, for example: update of data, such as the location area ID, the cell ID, the mobile characteristic number and the like, which is controlled by the mobility control unit 92; reception of signals; and the like.

When such an event notification request is made, the mobility control unit 92 monitors the occurrence of the event to be notified according to the event notification request. Then, for example, when the event to be notified occurs, such as the data update, the reception of signals or the like (502b), the mobility control unit 92 generates an event occurrence notification (503b). The programming interface 94 obtains the event occurrence notification from the mobility control unit 92 and provides the notification to the advanced processing unit 95. The event occurrence notification notifies the occurrence of the event. In the event occurrence notification, the type and contents of the events that occurred and the like are included.

Figure 23:
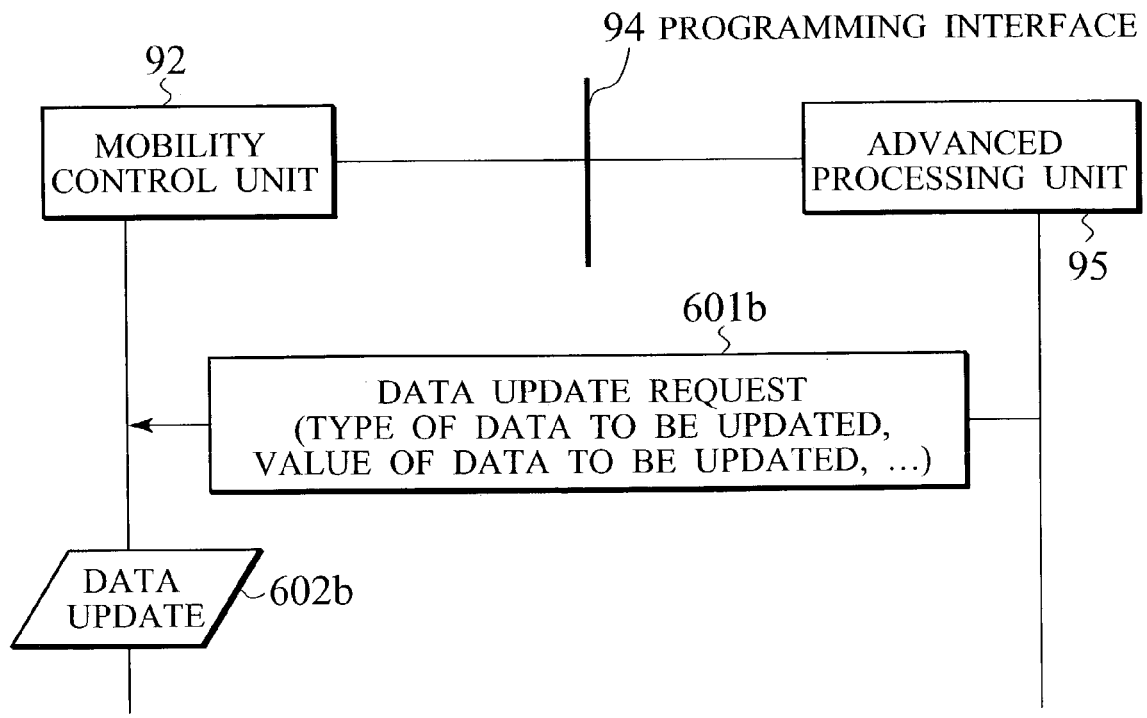
FIG. 23 is a view showing an operation when the advanced processing unit of the mobile communication terminal instructs data update to the mobility control unit, according to the embodiment of the present invention.

FIG. 23 shows an operation when the advanced processing unit 95 of the mobile communication terminal 90 instructs data update to the mobility control unit 92. The advanced processing unit 95 generates a data update request as a command for instructing the mobility control unit 92 to update the data controlled by the mobility control unit 92, that is, data stored in the storage unit 93 and the like in accordance with the movement of the mobile communication terminal 90 (601b). The programming interface 94 obtains the data update request from the advanced processing unit 95 and provides the request to the mobility control unit 92. Included in the data update request are: a type of data to be updated such as the location area ID and the like; values of data to be updated; and the like. Moreover, in the data update request, instead of the values of data to be updated, values of data to find out the values of data to be updated may be included. When the data update request as described above is performed, the mobility control unit 92 performs the data update in accordance with the data update request (602b).

Figure 24:
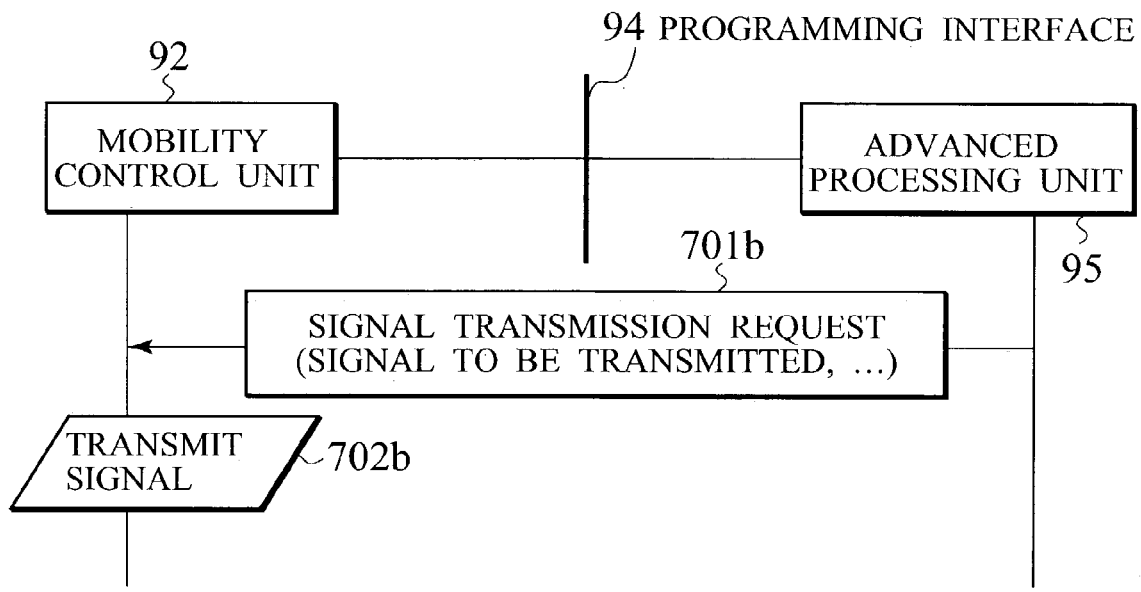
FIG. 24 is a view showing an operation when the advanced processing unit of the mobile communication terminal instructs transmission of a signal to the mobility control unit, according to the embodiment of the present invention.

FIG. 24 shows an operation when the advanced processing unit 95 of the mobile communication terminal 90 instructs the mobility control unit 92 to transmit a signal. The advanced processing unit 95 generates a signal transmission request as a command for instructing the mobility control unit 92 to transmit a signal in accordance with the movement of the mobile communication terminal 90 (701b). Then, the programming interface 94 obtains the signal transmission request from the advanced processing unit 95 and provides the request to the mobility control unit 92. A signal to be transmitted and the like are included in the signal transmission request. For example, as the signal to be transmitted, there are a position registration request signal and the like. When the signal transmission request as described above is performed, the mobility control unit 92 instructs the wireless communication unit 91 to transmit the signal in accordance with the signal transmission request. And the wireless communication unit 91 transmits the signal (702b). Note that the advanced processing unit 95 can determine a type of a specific signal to generate the signal transmission request and can store the same. As to those other than the specific signal, the advanced processing unit 95 does not generate the signal transmission request.

Figure 25:
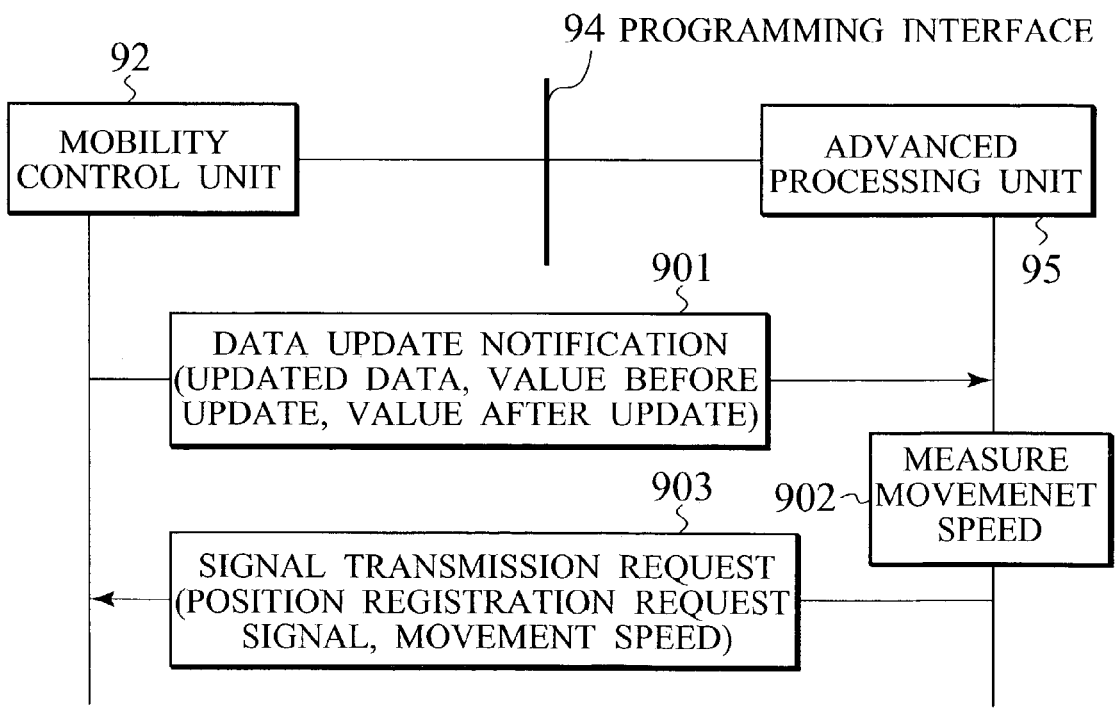
FIG. 25 is a view showing an operation of the advanced processing unit when a data update notification from the mobility control unit of the mobile communication terminal is taken as a cue, according to the embodiment of the present invention.

Taking the notification from the mobility control unit 92 as a cue, the advanced processing unit 95 may perform a series of operations to perform the second processing and generate a command in accordance with the second processing result. FIG. 25 shows an operation of the advanced processing unit 95 taking the data update notification from the mobility control unit 92 of the mobile communication terminal 90 as a cue. In accordance with the movement of the mobile communication terminal 90, the wireless communication unit 91 receives the broadcast information signal transmitted from the base station 80, and the mobility control unit 92 obtains the broadcast information signal from the wireless communication unit 91. The mobility control unit 92 compares the cell ID included in the broadcast information signal with the cell ID stored in the cell ID storage region 93*b*. The mobility control unit 92 performs the data update when the cell IDs do not coincide with each other. Then, the mobility control unit 92 generates a data update notification (901). Then, the programming interface 94 obtains the data update notification from the mobility control unit 92 and provides the notification to the advanced processing unit 95. Here, in the data update notification, the type of the updated data is the cell ID and values of the cell ID before and after the update are included.

Taking the data update notification as a cue, the movement speed measurement sub-unit 95*a* of the advanced processing unit 95 measures the movement speed as the second processing (902). Then, the advanced processing unit 95 generates a signal transmission request (903). The programming interface 94 obtains the signal transmission request from the advanced processing unit 95 and provides the request to the mobility control unit 92. Specifically, the advanced processing unit 95 generates a position registration request signal including the measured movement speed and generates a signal transmission request for instructing transmission of the position registration request signal to be transmitted.

As described above, the advanced processing unit 95 of the mobile communication terminal 90 includes the movement speed measurement sub-unit 95*a*, and the movement speed measurement sub-unit 95*a* can measure the movement speed of the mobile communication terminal 90. Therefore, the advanced processing unit 95 generates the position registration request signal including the movement speed as the expansion parameter and can generate the signal transmission request including the position registration request signal. Then, the programming interface 94 obtains the signal transmission request from the advanced processing unit 95 and provides the request to the mobility control unit 92. Thus, in accordance with the signal transmission request, the mobility control unit 92 can transmit the position registration request signal including the movement speed to the location register 60 of the mobile communication network 30.

Figure 26:
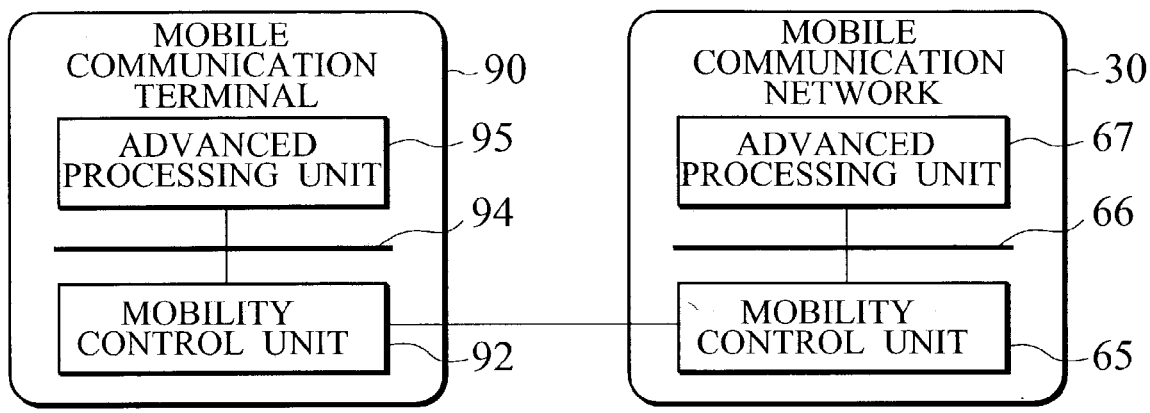
FIG. 26 is a view showing the mobile communication terminal and a mobile communication network according to the embodiment of the present invention.

As described above, the mobility control functions of the mobile communication terminal 90 and the mobile communication network 30 exchange information necessary for the mobility control therebetween. And the mobile communication terminal 90 and the location register 60 installed in the mobile communication network 30 can perform the mobility control of the entire mobile communication system 1. As shown in FIG. 26, the mobility control unit 92 of the mobile communication terminal 90 and the advanced processing unit 95 are linked up with each other via the programming interface 94. The mobility control unit 92 of the mobile communication terminal 90 and the mobility control unit 65 of the location register 60 installed in the mobile communication network 30 are linked up with each other via the base station 80, the exchange network 70 and the like. Then, the mobility control unit 65 of the mobile communication network 30 and the advanced processing unit 67 are linked up with each other via the programming interface 66. Thus, the mobility control functions of the mobile communication terminal 90 and the mobile communication network 30 are linked up with each other and enable the mobility control of the entire mobile communication system 1.

Figure 27:
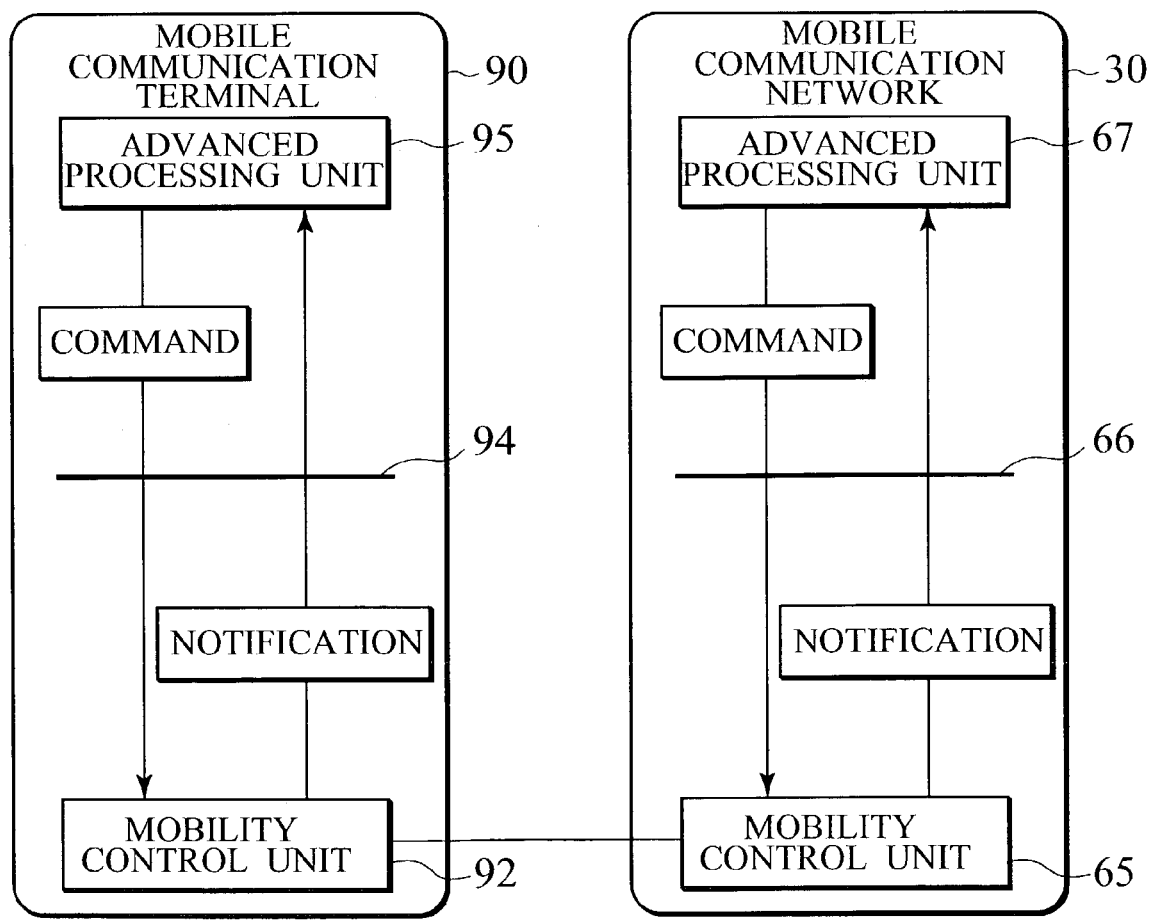
FIG. 27 is a view showing the mobile communication terminal and the mobile communication network according to the embodiment of the present invention.

Specifically, as shown in FIG. 27, in the mobile communication terminal 90, the programming interface 94 receives and transmits the notification transmitted from the mobility control unit 92 to the advanced processing unit 95 and the command transmitted from the advanced processing unit 95 to the mobility control unit 92 therebetween, thus linking up the mobility control unit 92 and the advanced processing unit 95. The mobility control unit 92 of the mobile communication terminal 90 and the mobility control unit 65 of the location register 60 installed in the mobile communication network 30 are linked up with each other by exchanging the position registration request signal, the position registration response signal and the like therebetween via the wireless communication unit 91, the base station 80, the exchange network 70 and the communication interface 64. Furthermore, in the mobile communication network 30, the programming interface 66 receives and transmits the notification transmitted from the mobility control unit 65 to the advanced processing unit 67 and the command transmitted from the advanced processing unit 67 to the mobility control unit 65 therebetween, thus linking up the mobility control unit 65 and the advanced processing unit 67.

Figure 28:
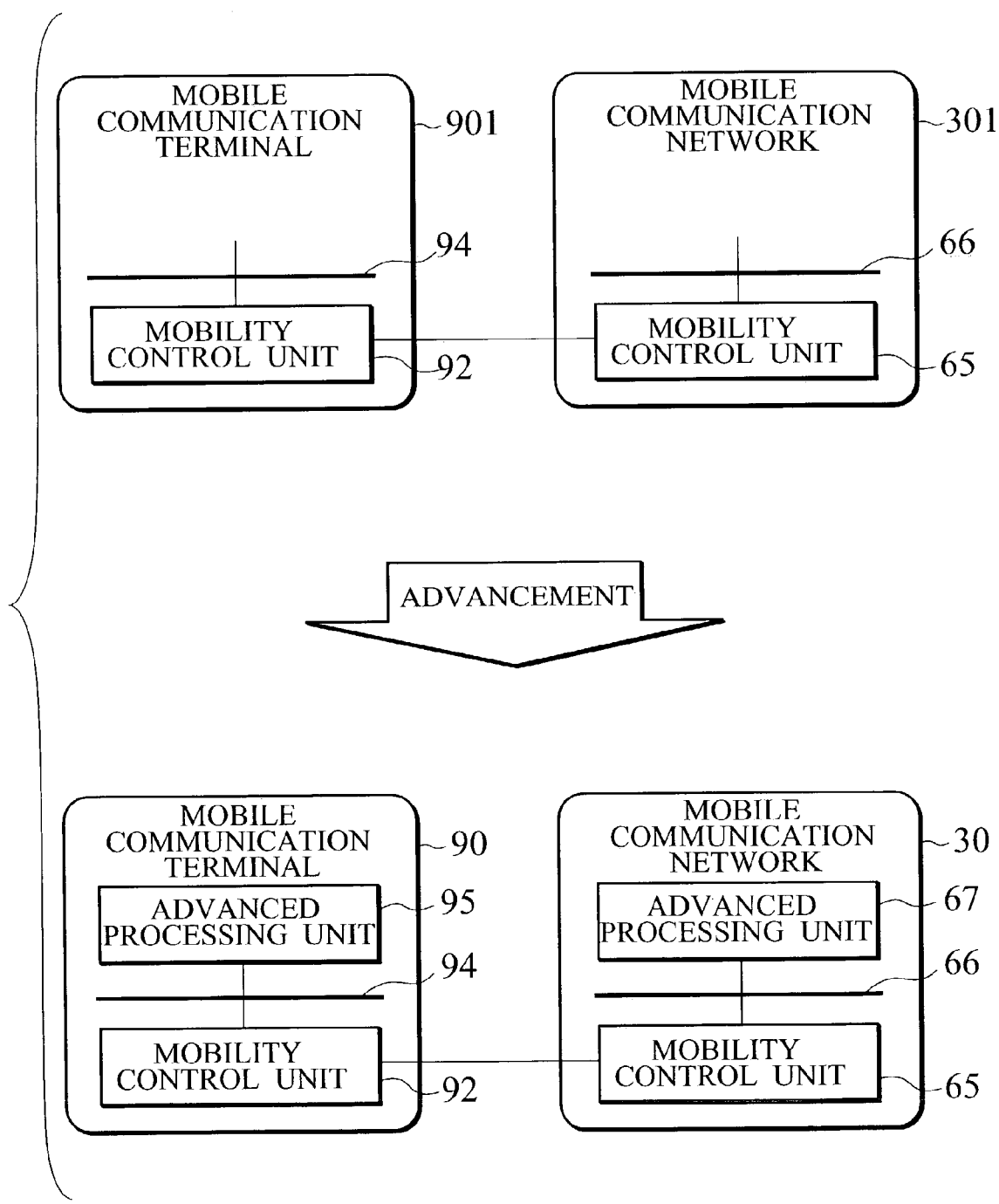
FIG. 28 is a view showing a method of advancing a mobility control function according to the embodiment of the present invention.

FIG. 28 is a view explaining a method of advancing the mobility control function. As shown in FIG. 28, first produced are: a mobile communication terminal 901 including the mobility control unit 92 and the programming interface 94; and a location register installed in a mobile communication network 301, which includes the mobility control unit 65 and the programming interface 66. Then, when the improvement of the mobility control functions of the mobile communication terminal 901 and the mobile communication network 301 is requested by means of adding processing to the mobility control performed by the mobility control units 92 and 65, the advanced processing units 95 and 67, which perform the processing to be added, are developed. The advanced processing units 95 and 67 are installed into the mobile communication terminal 901, and the location registers installed in the mobile communication network 301 via the programming interfaces 94 and 66. Thus, the mobility control function of the mobile communication terminal 90 can be easily advanced. And the mobility control function of the mobile communication network 30 installing the location register can be easily advanced.

(Communication Method)

Figure 29A:
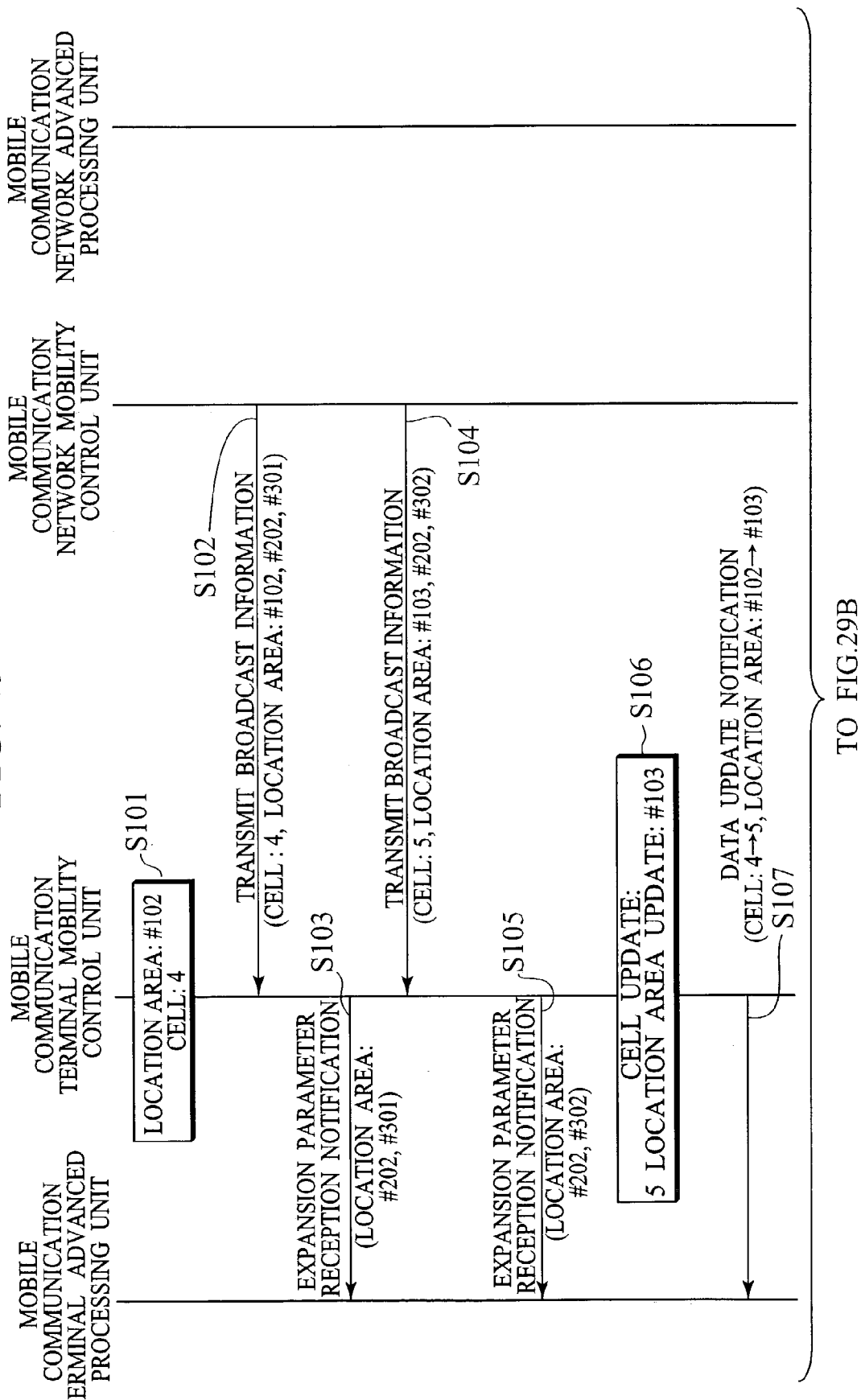

Next, description will be made for a communication method using the mobile communication system 1. As shown in FIG. 29A, first, the mobile characteristic number #1 is stored in the mobile characteristic number storage region 93*a* of the storage unit 93 controlled by the mobility control unit 92 of the mobile communication terminal 90. A cell ID "4" is stored in the cell ID storage region 93*b*. A location area ID #102 is stored in the location area ID storage region 93*c* (S101). The base station 80 of the mobile communication network 30 transmits a broadcast information signal including the cell ID "4" and the location area IDs #102, #202 and #301 allocated to the cell of the cell ID "4", when the base station 80 receives a notification of a location area ID of a location area allocated to a cell covered by the base station 80, from the mobile control unit 65 of the location register 60 (102).

The mobility control unit 92 of the mobile communication terminal 90 determines whether or not the broadcast information signal received by the wireless communication unit 91 and obtained therefrom includes an expansion parameter. If so, the mobility control unit 92 generates an expansion parameter reception notification including the location area IDs #202 and #301 corresponding to the mobile characteristic numbers #2 and #3 as the expansion parameters. The programming interface 94 provides the generated expansion parameter reception notification to the advanced processing unit 95 (S103).

Note that the mobility control unit 92 compares the received cell ID "4" and the location area ID #102 with the cell ID 4 and the location area ID #102 stored in the cell ID storage region 93b and the location area ID storage region 93c. Then, since they both coincide with each other, the mobility control unit 92 determines that there is no change in the cell ID and the location area ID, and thus does not perform data update thereof. Moreover, since the mobile characteristic of the current mobile communication terminal 90 is the mobile characteristic number #1, the advanced processing unit 95 does not perform any operation upon it obtains the expansion parameter reception notification related to the mobile characteristic numbers #2 and #3.

Next, the base station 80 of the mobile communication network 30 receives a notification of a location area ID from the mobility control unit 65 of the location register 60 and transmits a broadcast information signal including the cell ID "5" and the location area IDs #103, #202 and #302 allocated to a cell ID "5" (S104). The mobility control unit 92 of the mobile communication terminal 90 determines whether or not the broadcast information signal obtained from the wireless communication unit 91 includes an expansion parameter. Then, the mobility control unit 92 generates an expansion parameter reception notification including the location area IDs #202 and #302 corresponding to the mobile characteristic numbers #2 and #3 as the expansion parameters. The programming interface 94 provides the generated expansion parameter reception notification to the advanced processing unit 95 (S105).

The mobility control unit 92 compares the received cell ID "5" and the location area ID #103 with the cell ID "4" and the location area ID #102 stored in the cell ID storage region 93b and the location area ID storage region 93c. Since they do not coincide with each other, the mobility control unit 92 determines that there has been a change in the cell ID and the location area ID. Then, the mobility control unit 92 updates the data of the cell ID storage region 93b and the location area ID storage region 93c to be the cell ID "5" and the location area ID #103 (S106). The mobility control unit 92 generates a data update notification including that the type of the updated data is the cell ID, that the cell ID is "4" before the update and "5" after the update, the type of the updated data is the location area ID and the location area ID is "#102" before the update and "#103" after the update. The programming interface 94 obtains the data update notification from the mobility control unit 92 and provides the notification to the advanced processing unit 95 (S107).

As shown in FIG. 29B, the movement speed measurement sub-unit 95a of the advanced processing unit 95 measures the movement speed of the mobile communication terminal 90, when the advanced processing unit 95 receives the data update notification (S108). Then, the advanced processing unit 95 generates a position registration request signal including the measured movement speed V1, and generates a signal transmission request for instructing the mobility control unit 92 to transmit the generated position registration request signal to be transmitted to the base station 80 of the mobile communication network 30. Thereafter, the programming interface 94 obtains the signal transmission request from the advanced processing unit 95 and provides the request to the mobility control unit 92 (S109). When the mobility control unit 92 obtains the signal transmission request from the programming interface 94, the mobility control unit 92 transmits the position registration request signal including the movement speed V1 to the base station 80 in the mobile communication network 30 in accordance with the obtained request (S110). The mobility control unit 65 of the location register 60 in the mobile communication network 30 obtains the position registration request signal via the base station 80 and the communication interface 64.

Since the position registration request signal includes the movement speed as the expansion parameter, the mobility control unit 65 generates an expansion parameter reception notification including the mobile communication terminal ID of the mobile communication terminal 90 which has transmitted the position registration request signal and the movement speed V1 as the expansion parameter. The programming interface 66 obtains the expansion parameter reception notification from the mobility control unit 65 and provides the notification to the advanced processing unit 67 (S111). Taking the expansion parameter reception notification as a cue, the advanced processing unit 67 searches through the mobile characteristic table 61 based on the movement speed V1 included in the expansion parameter reception notification and finds out the mobile characteristic of the mobile communication terminal 90 (S112). Here, the movement speed V1 is within the range of 20 to 40 km/h. Thus, the advanced processing unit 67 finds out that the mobile characteristic of the mobile communication terminal 90 is #2 from the mobile characteristic table 61. Based on the mobile characteristic number #2 and the cell ID "5" of the base station 80 having received the position registration request signal, the advanced processing unit 67 searches through the location area control table 62 and finds out that the existent location area of the mobile communication terminal 90 is the location area ID #202. Then, the advanced processing unit 67 generates a data update request including the mobile communication terminal ID of the mobile communication terminal 90 to which the position registration response signal has been transmitted, the location area ID as the type of the data to be updated and the value "#202" of the location area ID to be updated. The programming interface 66 obtains the data update request from the advanced processing unit 67 and provides the request to the mobility control unit 65 (S113).

The mobility control unit 65 updates the location area ID of the home memory 63, which corresponds to the mobile communication terminal ID included in the data update request, from "#102" to "#202" (S114). Note that, in this event, the mobility control unit 65 updates the cell ID from "4" to "5". Then, the mobility control unit 65 generates a data update notification including the updated mobile communication terminal ID of the mobile communication terminal 90, the location area ID as the type of the updated data, the value "#102" of the location area ID before the data update and the value "#202" of the location area ID after the data update. The programming interface 66 obtains the data update notification from the mobility control unit 65 and provides the notification to the advanced processing unit 67 (S115).

Taking the data update notification as a cue, the advanced processing unit 67 generates a position registration response signal including the mobile characteristic number #2. Then, the advanced processing unit 67 generates a signal transmission request including the mobile communication terminal ID of the mobile communication terminal 90 having transmitted the position registration request signal, and the position registration response signal including the mobile characteristic number #2. The programming interface 66 obtains the signal transmission request from the advanced processing unit 67 and provides the request to the mobility control unit 65 (S116).

In accordance with the signal transmission request, the mobility control unit 65 transmits the position registration response signal including the mobile characteristic number #2 to the mobile communication terminal 90 via the communication interface 64 (S117). The wireless communication unit 91 of the mobile communication terminal 90 receives the position registration response signal and provides the signal to the mobility control unit 92. Since the position registration response signal includes the mobile characteristic number #2 as the expansion parameter, the mobility control unit 92 generates an expansion parameter reception notification including the mobile characteristic number #2 as the expansion parameter. The programming interface 66 obtains the expansion parameter reception notification and provides the notification to the advanced processing unit 95 (S118).

Taking the expansion parameter reception notification as a cue, based on the mobile characteristic number #2 included in the position registration response signal, the advanced processing unit 95 finds out from the broadcast information that the location area ID of the location area corresponding to the mobile characteristic number #2 allocated to the cell of the cell ID "5" where the mobile communication terminal 90 currently exists is "#202". Then, the advanced processing unit 95 generates a data update request including the location area ID as the data to be updated and the value "#202" of the location area ID to be updated. The programming interface 94 obtains the data update request from the advanced processing unit 95 and provides the request to the mobility control unit 92 (S119).

In accordance with the data update request, the mobility control unit 92 updates the data by storing the location area ID #202 in the location area ID storage region 93c (S120). Note that, in this event, the mobility control unit 92 updates the mobile characteristic number from the mobile characteristic number #1 to the mobile characteristic number #2. Finally, the mobility control unit 92 generates a data update notification including the location area ID as the updated data, the number "#103" of the location area before the update and the number "#202" of the location area ID after the update. The programming interface 94 obtains the data update notification and provides the notification to the advanced processing unit 95 (S121).

According to the mobile communication system 1, the mobile communication network 30, the location register 60, the mobile communication terminal 90 and the communication method which are described above, the mobility control unit 65 of the location register 60 and the mobility control unit 92 of the mobile communication terminal 90 perform the first processing in accordance with the movement of the mobile communication terminal 90, and generate the notification related to the first processing. The programming interfaces 66 and 94 obtain the notification from the mobility control units 65 and 92, and provide the notification to the advanced processing units 67 and 95. Then, based on the notification provided by the programming interfaces 66 and 94, the advanced processing units 67 and 95 can perform the second processing different from the first processing performed by the mobility control units 65 and 92.

Accordingly, the mobility control units 65 and 92 and the advanced processing units 67 and 95 are linked up with each other by the programming interfaces 66 and 94, and the advanced processing units 67 and 95 can perform the second processing different from the first processing performed by the mobility control units 65 and 92, based on the first processing performed by the mobility control units 65 and 92. Thus the second processing performed by the advanced units 67 and 95 can be easily added to the first processing performed by the mobility control units 65 and 92.

Therefore, by newly developing only the advanced processing units 67 and 95 performing the second processing desired to be added to the first processing performed by the mobility control units 65 and 92 of the location register 60 and the mobile communication terminal 90, and only by replacing the advanced processing units 67 and 95 with newly developed ones, the mobility control functions of the location register 60 and the mobile communication terminal 90 can be easily advanced. It is possible to easily create advanced location register 60 and mobile communication terminal 90, which can realize for example, the following, a reduction in the amount of signals need for mobility control; a reduction in the processing load for mobility control of the location register 60 and the mobile communication terminal 90; improvement of the quality of mobile communication services such as the reduction packet transmission loss; improvement in mobile communication efficiency; and the like. As a result, it is possible to facilitate the introduction of an advanced mobility control method to the location register 60 and the mobile communication terminal 90.

Furthermore, the advanced processing units 67 and 95 generate the command to the mobility control units 65 and 92. Then, the programming interfaces 66 and 94 obtain the command from the advanced processing units 67 and 95 and provide the command to the mobility control units 65 and 92. Thereafter, the mobility control units 65 and 92 can perform the processing based on the commands provided by the advanced processing units 67 and 95.

Accordingly, the mobility control units 65 and 92 and the advanced processing units 67 and 95 are linked up with each other by the programming interfaces 66 and 94, and the mobility control units 65 and 92 can perform the processing based on the commands generated by the advanced processing units 67 and 95. Thus, the advanced processing units 67 and 95 can easily control the mobility control units 65 and 92. Therefore the mobility control functions of the location register 60 and the mobile communication terminal 90 can be easily advanced, by newly developing only the advanced processing units 67 and 95 which generate the commands that instruct the processing desired to be performed by the mobility control units 65 and 92 of the location register 60 and the mobile communication terminal 90 and by replacing only the advanced processing units 67 and 95 with newly developed ones. It is possible to easily create advanced location register 60 and mobile communication terminal 90, which can realize the following, for example: a reduction in an amount of signals for mobility control; a reduction in a processing load for mobility control of the location register 60 and the mobile communication terminal 90; improvement in quality of the mobile communication services such as a reduction of loss in packet transmission; improvement in mobile communication efficiency; and the like. As a result, it is possible to facilitate the introduction of an advanced mobility control method to the location register 60 and the mobile communication terminal 90.

Note that the present invention is not limited to the foregoing embodiment, and that various modifications are possible. For example, in the foregoing embodiment, description was made with reference to the example in which the mobility control unit 65 and the advanced processing unit 67 in the mobile communication network 30 are provided in the location register 60. The mobility control unit 65 and the advanced processing unit 67 in the mobile communication network 30 may be provided in any of the units within the mobile communication network 30. For example, when the mobility control unit and the advanced processing unit are provided in the base station 80, the mobility control unit can perform handover control and the like as the processing performed by the base station 80 in accordance with the movement of the mobile communication terminal 90, and the advanced processing unit can advance the above described processing. Moreover, when the mobility control unit and the advanced processing unit are provided in the exchange 71, the mobility control unit can perform paging and the like as the processing performed by the exchange 71 in accordance with the movement of the mobile communication terminal 90, and the advanced processing unit can advance the above described processing.

What is claimed is:

1. A mobility control apparatus, comprising:
   a mobility control unit configured to perform a first processing in accordance with movement of a mobile communication terminal and generate a notification related to the first processing;
   a processing unit configured to perform a second processing different from the first processing performed by the mobility control unit;
   a notification providing unit configured to obtain the notification from the mobility control unit and provide the notification to the processing unit; and
   a data storage unit configured to store data related to the mobile communication terminal, wherein
   the mobility control unit updates the data stored in the data storage unit in accordance with the movement of the mobile communication terminal, as the first processing, and generates a data update notification for notifying information related to the data update, as the notification;
   the notification providing unit constitutes a programming interface which is an independent unit from the mobility control unit and the processing unit, obtains the data update notification from the mobility control unit, and provides the data update notification to the processing unit; and
   the processing unit performs the second processing based on the data update notification.

2. The mobility control apparatus according to claim 1, further comprising:
   a reception unit configured to receive a signal transmitted in accordance with the movement of the mobile communication terminal, wherein
   the mobility control unit obtains the signal from the reception unit, and generates a signal reception notification for notifying information related to reception of the signal, and
   the notification providing unit obtains the signal reception notification and provides the signal reception notification to the processing unit.

3. The mobility control apparatus according to claim 2, wherein
   the mobility control unit stores a type of data used in the first processing performed by the mobility control unit, compares the signal with the type of data, and generates an expansion parameter reception notification for notifying information related to an expansion parameter when an expansion parameter other than the type of data used in the first processing is included in the signal, and
   the notification providing unit obtains the expansion parameter reception notification and provides the expansion parameter reception notification to the processing unit.

4. The mobile control apparatus according to claim 3, wherein
   the expansion parameter is a movement speed of the mobile communication terminal, and
   the processing unit obtains the movement speed from the expansion parameter reception notification, and finds out a mobile characteristic of the mobile communication terminal, which is determined in accordance with the movement speed of the mobile communication terminal, based on the movement speed, as the second processing.

5. The mobile control apparatus according to claim 4, wherein
   the second processing includes determining a location area ID based on the mobile characteristic and cell ID.

6. A mobility control apparatus, comprising:
   an instruction unit configured to generate a command to a mobility control unit performing a processing in accordance with movement of a mobile communication terminal; and
   a command providing unit configured to obtain the command from the instruction unit and provide the command to the mobility control unit; wherein
   when a predetermined event occurs in accordance with the movement of the mobile communication terminal, the instruction unit generates an event notification request to notify the occurrence of the predetermined event, as the command;
   the command providing unit constitutes a programming interface which is an independent unit from the mobility control unit and the instruction unit, obtains the event notification request from the instruction unit, and provides the instruction to the mobility control unit; and
   the mobility control unit is configured to perform the processing based on the command.

7. The mobile control apparatus according to claim 6, further comprising:
   a data storage unit configured to store data related to the mobile communication terminal, wherein
   the instruction unit generates a data update request for instructing to update data stored in the data storage unit in accordance with the movement of the mobile communication terminal, and
   the command providing unit obtains the data update request and provides the data update request to the mobility control unit.

8. The mobile control apparatus according to claim 7, wherein
   the instruction unit generates the data update request for instructing to update a location area ID stored in the data storage unit after determining a mobile characteristic and the location area ID.

9. The mobile control apparatus according to claim 6, further comprising:
   a transmission unit configured to transmit a signal in accordance with the movement of the mobile communication terminal, wherein
   the instruction unit generates a signal transmission request for instructing to transmit the signal, the command providing unit obtains the signal transmission request from the instruction unit, and provides the signal transmission request to the mobility control unit, and the mobility control unit instructs the transmission unit to transmit the signal in accordance with the signal transmission request.

10. A mobile communication terminal, comprising:

a mobility control unit configured to perform a first processing in accordance with movement of the mobile communication terminal and generate a notification related to the first processing;

a processing unit configured to perform a second processing different from the first processing performed by the mobility control unit the notification providing unit configured to obtain the notification from the mobility control unit and provide the notification to the processing unit; and a data storage unit configured to store data that changes in accordance with the movement; wherein the mobility control unit updates the data stored in the data storage unit in accordance with the movement, as the first processing, and generates a data update notification for notifying information related to the data update, as the notification;

the notification providing unit constituting a programming interface which is an independent unit from the mobility control unit and the processing unit, obtains the data update notification from the mobility control unit and provides the data update notification to the processing unit; and the processing unit performs the second processing based on the data update notification.

11. The mobile communication terminal according to claim 10, further comprising:

a reception unit configured to receive a signal transmitted in accordance with the movement, wherein the mobility control unit obtains the signal from the reception unit, and generates a signal reception notification for notifying information related to reception of the signal, and the notification providing unit obtains the signal reception notification and provides the signal reception notification to the processing unit.

12. The mobile communication terminal according to claim 11, wherein the mobility control unit stores a type of data used in the first processing performed by the mobility control unit, compares the signal with the type of data, and generates an expansion parameter reception notification for notifying information related to an expansion parameter, when an expansion parameter other than the type of data used in the first processing is included in the signal, and the notification providing unit obtains the expansion parameter reception notification and provides the expansion parameter reception notification to the processing unit.

13. The mobile communication terminal according to claim 10, wherein the processing unit measures a movement speed, as the second processing.

14. A mobile communication terminal, comprising:

an instruction unit configured to generate a command to a mobility control unit performing a processing in accordance with movement of the mobile communication terminal; and a command providing unit configured to obtain the command from the instruction unit and provide the command to the mobility control unit; wherein when a predetermined event occurs in accordance with the movement, the instruction unit generates an event notification request to notify the occurrence of the predetermined event, as the command;

the command providing unit constitutes a programming interface which is an independent unit from the mobility control unit and the instruction unit, obtains the event notification request and provides the event notification request to the mobility control unit; and the mobility control unit is configured to perform the processing based on the command.

15. The mobile communication terminal according to claim 14, further comprising:

a data storage unit configured to store data that changes in accordance with the movement, wherein the instruction unit generates a data update request for instructing to update data stored in the data storage unit in accordance with the movement of the mobile communication terminal, and the command providing unit obtains the data update request from the instruction unit, and provides the data update request to the mobility control unit.

16. The mobile communication terminal according to claim 14, further comprising:

a transmission unit configured to transmit a signal in accordance with the movement, wherein the instruction unit generates a signal transmission request to transmit the signal, as the command, the command providing unit obtains the signal transmission request, from the instruction unit, and provides the signal transmission request to the mobility control unit, and the mobility control unit instructs the transmission unit to transmit the signal in accordance with the signal transmission request.

17. A mobile communication system, comprising:

a mobile communication terminal; and a mobility control apparatus configured to perform a processing in accordance with movement of the mobile communication terminal, wherein the mobility control apparatus comprises (a) a mobility control unit configured to perform a first processing in accordance with the movement of the mobile communication terminal and generate a notification related to the first processing;

(b) a processing unit configured to perform, a second processing different from the first processing performed by the mobility control unit, based on the notification;

(c) a notification providing unit configured to obtain the notification from the mobility control unit and provide the notification to the processing unit; and (d) a data storage unit configured to store data related to the mobile communication terminal, wherein:

the mobility control unit updates the data stored in the data storage unit in accordance with the movement of the mobile communication terminal, as the first processing, and generates a data update notification for notifying information related to the data update, as the notification;

the notification providing unit constitutes a programming interface which is an independent unit from the mobility control unit and the processing unit, obtains the data update notification from the mobility control unit, and provides the data update notification to the processing unit; and the processing unit performs the second processing based on the data update notification.

18. A mobile communication system, comprising:

a mobile communication terminal; and a mobility control apparatus configured to perform a processing in accordance with movement of the mobile communication terminal, wherein the mobility control apparatus comprises (a) an instruction unit configured to generate a command to a mobility control unit performing a processing in accordance with the movement of a mobile communication terminal; and (b) a command providing unit configured to obtain the command from the instruction unit and provide the command to the mobility control unit;

wherein when a predetermined event occurs in accordance with the movement of the mobile communication terminal, the instruction unit generates an event notification request for instructing to notify the occurrence of the predetermined event, as the command; the command providing unit constitutes a programming interface which is an independent unit from the mobility control unit and the instruction unit, and obtains the event notification request from the instruction unit, and provides the instruction to the mobility control unit; and the mobility control unit is configured to perform the processing based on the command.

* * * * *